United States Patent
Momono et al.

(10) Patent No.: US 9,236,075 B2
(45) Date of Patent: Jan. 12, 2016

(54) CRYSTALLIZED GLASS AND CRYSTALLIZED GLASS SUBSTRATE FOR INFORMATION RECORDING MEDIUM

(71) Applicant: OHARA INC., Kanagawa (JP)

(72) Inventors: Kiyoyuki Momono, Kanagawa (JP); Katsuhiko Yamaguchi, Kanagawa (JP); Toshitaka Yagi, Kanagawa (JP); Naoyuki Goto, Kanagawa (JP)

(73) Assignee: OHARA INC., Kanagawa (JP)

(*) Notice: Subject to any disclaimer, the term of this patent is extended or adjusted under 35 U.S.C. 154(b) by 0 days.

(21) Appl. No.: 14/081,583

(22) Filed: Nov. 15, 2013

(65) Prior Publication Data
US 2014/0141285 A1    May 22, 2014

(30) Foreign Application Priority Data

Nov. 16, 2012 (JP) ................................. 2012-251971
Mar. 14, 2013 (JP) ................................. 2013-051230

(51) Int. Cl.
*G11B 5/73* (2006.01)
*G11B 5/62* (2006.01)
*C03C 1/00* (2006.01)

(52) U.S. Cl.
CPC ... *G11B 5/62* (2013.01); *C03C 1/00* (2013.01); *G11B 5/7315* (2013.01)

(58) Field of Classification Search
None
See application file for complete search history.

(56) References Cited

U.S. PATENT DOCUMENTS

| 6,197,710 | B1 * | 3/2001 | Ohara et al. ................. 501/4 |
| 6,245,411 | B1 * | 6/2001 | Goto et al. ................ 428/141 |
| 6,429,160 | B1 * | 8/2002 | Nakajima et al. ............ 501/5 |
| 6,495,480 | B1 * | 12/2002 | Goto ........................ 501/4 |
| 6,819,526 | B2 * | 11/2004 | Kataoka et al. ......... 360/97.11 |
| 8,283,060 | B2 * | 10/2012 | Yagi et al. .............. 428/846.9 |
| 2011/0135964 | A1 * | 6/2011 | Yagi et al. .............. 428/846.9 |

FOREIGN PATENT DOCUMENTS

| JP | 07-300340 | 11/1995 |
| JP | 09-077531 | 3/1997 |
| JP | 2000185940 A * | 7/2000 |
| JP | 2011207626 A * | 10/2011 |

OTHER PUBLICATIONS

JPO Abstract Translation of JP2000-185940 A (pub. 2000).*
JPO Abstract Translation of JP2011-207626 A (pub 2011).*

* cited by examiner

*Primary Examiner* — Kevin Bernatz
(74) *Attorney, Agent, or Firm* — Rankin, Hill & Clark LLP

(57) ABSTRACT

It is an object of the present invention to provide a crystallized glass which has various properties required for employing the substrate for information recording medium of the next generation, and also has significantly low specific gravity; and a crystallized glass substrate for information recording medium. A crystallized glass containing, as a crystal phase, one or more selected from $RAl_2O_4$ and $R_2TiO_4$ (wherein R is one or more selected from Mg and Fe), the crystallized glass comprising the components of $SiO_2$ of 50% to 70%, $Al_2O_3$ of 10% to 26%, $TiO_2$ of 1 to 15%, MgO of 2.5% to 25%, FeO of 0% to 8%, and ZnO of 0% to less than 2%, expressed in terms of mass percentage on an oxide basis, wherein the value of $(Al_2O_3+MgO)/SiO_2$ is 0.30 or more and 0.65 or less, and a specific gravity is less than 2.63.

9 Claims, 1 Drawing Sheet

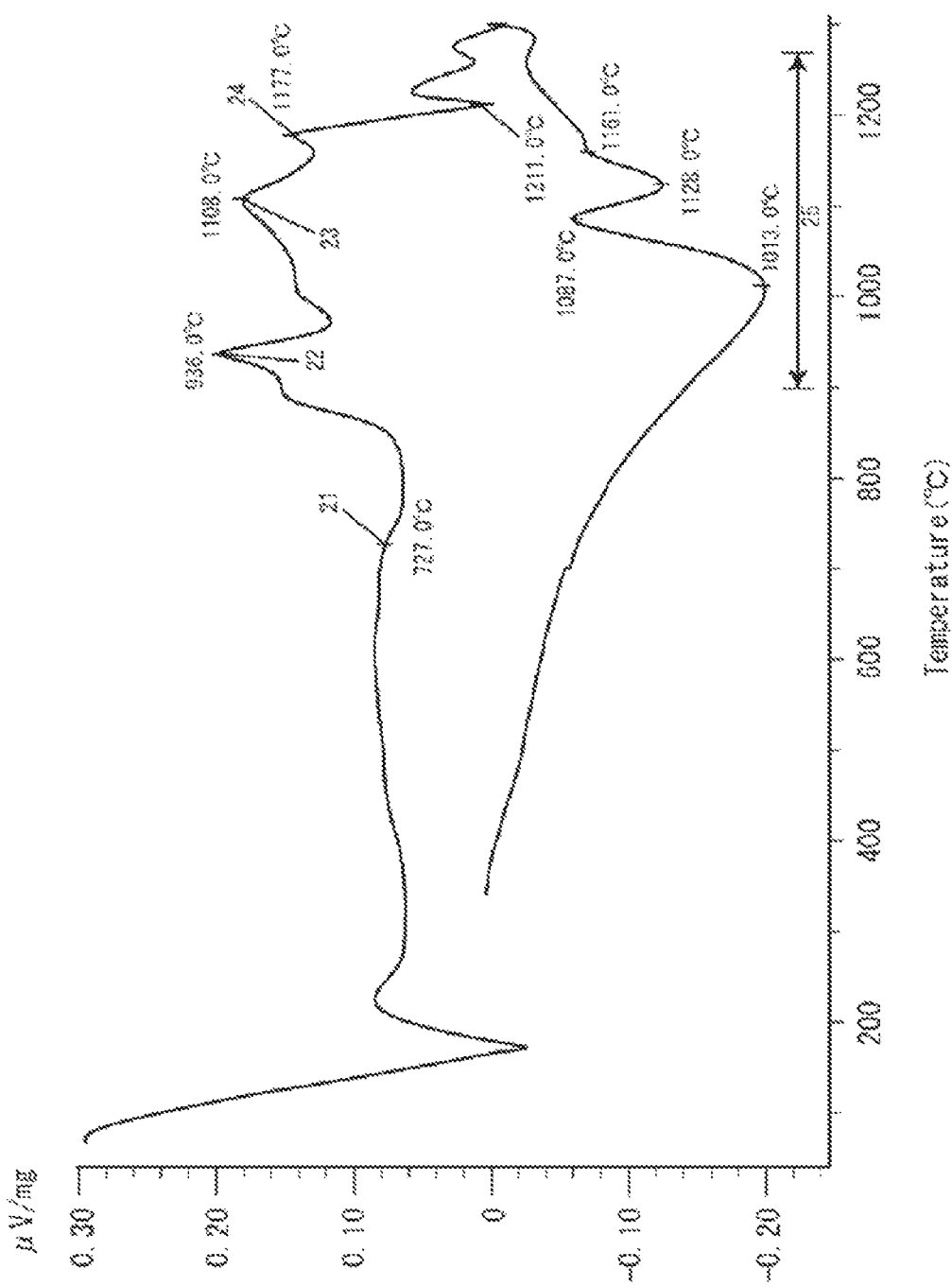

CRYSTALLIZED GLASS AND CRYSTALLIZED GLASS SUBSTRATE FOR INFORMATION RECORDING MEDIUM

This application is based on and claims the benefit of priority from Japanese Patent Application Nos. 2012-251971 and 2013-051230, respectively filed on 16 Nov. 2012 and 14 Mar. 2013, the content of which is incorporated herein by reference.

BACKGROUND OF THE INVENTION

1. Field of the Invention

The present invention relates to a crystallized glass which has significantly low specific gravity and high mechanical strength, and also has significantly smooth surface roughness after polishing. The present invention also relates to a crystallized glass substrate for information recording medium, which has physical properties required for substrate for information recording medium of the next generation.

The term "information recording medium" in the present invention means a magnetic recording medium which can be used in hard disks for various electronic devices.

2. Related Art

In recent years, large data files such as movie and audio files have been used in personal computers and various electronic devices, and thus information recording devices with larger capacity have been required. As a result, there has been a demand for higher recording density of information recording media year by year.

To contribute to satisfying this demand, a perpendicular magnetic recording system has been employed and mass production thereof has been advanced.

In the perpendicular magnetic recording system, heat resistance, surface smoothness, and mechanical strength of substrates are required to a level higher than that of conventional substrates. Young's modulus, flexural strength, and fracture toughness have become especially important evaluation points in mechanical strength, and an improvement in these properties is a problem to be solved.

It is also more important nowadays that specific gravity of a base material should be lowered so as to alleviate load placed on spindle motors or to prevent disks from being damaged when dropped.

Examples of the material used in substrates for information recording media include Al alloy, glass, and crystallized glass. Glass and crystallized glass are superior to Al alloys in view of higher Vickers hardness, Young's modulus, higher surface smoothness, and the like, and thus have often been employed in applications where dynamic use is envisaged.

Crystallized glass is also called glass ceramics and is a material obtained by heating glass to thereby precipitate crystals inside the glass, and is distinguished from amorphous solid. In the case of those produced by using glass as a starting material, those converted completely into crystals may be used as crystallized glass. Crystallized glass can be imparted with physical properties, which cannot be obtained by glass, by virtue of crystals dispersed inside the crystallized glass. Crystallized glass can impart characteristic values regarding mechanical strength such as Young's modulus or fracture toughness, etching resistance to an acidic or alkaline chemical solution, thermal properties such as thermal expansion coefficient, increase and disappearance (improvement in heat resistance) of glass transition temperature and the like, that cannot be realized by glass.

Similarly, crystallized glass can be imparted with physical properties which are different from those of ceramics obtained by sintering powders. Crystallized glass is produced by using glass as a starting material and precipitating crystals inside the glass, and is therefore free from vacancies as compared with ceramics, thus enabling formation of a dense structure.

While crystallized glass in current use is imparted with higher mechanical strength by virtue of crystals precipitated in a glass phase, the crystallized glass exhibits a difference in processing between precipitated crystals and glass phases or a difference in etching rate. Therefore, the crystallized glass currently being employed do not sufficiently satisfy requirements of surface roughness of Ra<2 Å, which is required of next generation substrates.

Furthermore, since the glass is brittle, defects such as breakage of substrates originating at microcracks on a surface of substrates are likely to occur.

Particularly, with the substrates for information recording medium used for the next generation of hard disks, resistance to crack propagation originating from microcracks on the surface of substrates, i.e., fracture toughness, has become an especially important evaluation point since the rotational speed of magnetic disks tends to be higher along with higher recording density. Therefore, the substrates for information recording medium are required to have higher fracture toughness.

However, the glass substrates currently being employed do not easily satisfy such requirements. Thus it is necessary to subject the substrate to a secondary strengthening treatment, for example, long-term chemical strengthening step so as to improve fracture toughness.

In the production of a glass substrate or a crystallized glass substrate, a direct press process is employed to directly press molten glass for the purpose of producing a disk-shaped substrate at lower cost.

In a glass melting process, an arsenic or antimony component has hitherto been used as a clarifying agent so as to remove bubbles from the molten glass when melting the glass. However, use of the arsenic or antimony component has recently been restricted since these components may exert an adverse influence on human bodies and the environment.

Therefore, use of a substitute component of the arsenic or antimony component as a clarifying agent has been studied. However, there arises a problem that, when the other clarifying agent is used, reboil generates in glass due to impact during direct pressing, and bubbles remain inside the substrate after pressing.

Thus, in order to solve these problems, the present inventors have developed a novel crystallized glass substrate for information recording medium and a patent application has been filed previously (Japanese Patent Application No. 2010-051242). Although this crystallized glass substrate for information recording medium is excellent in mechanical strength and surface smoothness after polishing, a lower specific gravity is required for a substrate for information recording medium of the next generation.

Patent Document 1 discloses a substrate for information recording medium, composed of crystallized glass including a gahnite crystal phase. The substrate has high fracture toughness, but surface roughness after polishing does not satisfy the level required for the substrate for information recording medium of the next generation.

It is also impossible for the substrate for information recording medium to satisfy the production cost required by the market due to lower polishing rate because of excessively high surface hardness, and lower productivity because of requiring longer time for the polishing process.

It is also very difficult for the crystallized glass to control degree of crystallinity and grain size of precipitated crystal since crystals are likely to precipitate rapidly when the raw glass is crystallized through a heat treatment.

Patent Document 2 discloses a glass ceramic containing a spinel type compound as a crystal phase. However, the melting temperature of the glass in Examples thereof is in a high temperature range from 1,500° C. to 1,650° C., and also the highest crystallizing temperature is in a range from 950° C. to 1,000° C., therefore, resulting in poor mass productivity. In addition, surface roughness Ra of the resulting glass ceramic is 5.3 Å, and thus fail to satisfy the desired surface properties.

[Patent Document 1] Japanese Unexamined Patent Application, Publication No. H07-300340

[Patent Document 2] Japanese Unexamined Patent Application, Publication No. H09-77531

SUMMARY OF THE INVENTION

It is an object of the present invention to provide a crystallized glass which has various properties required for employing the substrate in information recording medium of the next generation, and also has significantly low specific gravity; and a crystallized glass substrate for information recording medium.

It is another object of the present invention to provide a crystallized glass which is free from the generation of reboil during direct pressing and is suited to a direct press process without substantially using an arsenic component or an antimony component.

The present inventors have intensively studied so as to achieve the above objects and found that the above problems can be solved by defining the content and proportion of specific components, which constitute the crystallized glass containing, as a crystal phase, one or more selected from $RAl_2O_4$ and $R_2TiO_4$ (wherein R is one or more selected from Mg and Fe) (hereinafter also referred to as a "spinel type compound"), to specific values.

More specifically, aspects of the present invention are as follows. As used herein, the expression of "$RAl_2O_4$" and "$R_2TiO_4$" include solid solutions thereof.

(First Aspect)

A crystallized glass containing, as a crystal phase, one or more selected from $RAl_2O_4$ and $R_2TiO_4$ (wherein R is one or more selected from Mg and Fe), the crystallized glass comprising the components of
$SiO_2$ of 50% to 70%,
$Al_2O_3$ of 10% to 26%,
$TiO_2$ of 1 to 15%,
MgO of 2.5% to 25%,
FeO of 0% to 8%, and
ZnO of 0% to less than 2%, expressed in terms of mass percentage on an oxide basis,
wherein the value of
$(Al_2O+MgO)/SiO_2$ is 0.30 or more and 0.65 or less, and a specific gravity is less than 2.63.

(Second Aspect)

The crystallized glass according to the first aspect, wherein the total of the components of CaO, SrO, BaO, and $Y_2O_3$ is 1% or less, expressed in terms of mass percentage on an oxide basis.

(Third Aspect)

The crystallized glass according to the first or second aspect, wherein the $ZrO_2$ component is contained in the amount of 0% to 1.9%, expressed in terms of mass percentage on an oxide basis.

(Fourth Aspect)

The crystallized glass according to any one of the first to third aspects, further comprising the components of
$Al_2O_3$ of 12.8% to 26%,
MgO of 2.5% to 15%, and
$TiO_2$ of 1 to 11%, expressed in terms of mass percentage on an oxide basis,
wherein the value of $(Al_2O_3+MgO)/SiO_2$ is 0.30 or more and 0.62 or less.

(Fifth Aspect)

The crystallized glass according to any one of the first to fourth aspects, wherein an $R'_2O$ component (wherein R' is one or more selected from Li, Na, and K) is contained in the amount of 0% to 15%, expressed in terms of mass percentage on an oxide basis.

(Sixth Aspect)

The crystallized glass according to any one of the first to fifth aspects, further comprising the components of
CaO of 0% to 1%,
SrO of 0% to 1%,
BaO of 0% to 1%,
$P_2O_5$ of 0% to 7%,
$B_2O_3$ of 0% to 12%, and
$Y_2O_3$ of 0% to 1%, expressed in terms of mass percentage on an oxide basis.

(Seventh Aspect)

A crystallized glass substrate for information recording medium, using the crystallized glass according to any one of the first to sixth aspects.

(Eighth Aspect)

The crystallized glass substrate for information recording medium according to the seventh aspect, wherein a compression stress layer is formed at one or both of an outer periphery edge and an inner periphery edge of the crystallized glass substrate.

(Ninth Aspect)

The crystallized glass substrate for information recording medium according to the seventh or eighth aspect, wherein a compression stress layer is formed at one or both of two main surfaces of the crystallized glass substrate, and the thickness of the compression stress layer is less than 30 μm.

(Tenth Aspect)

An information recording medium, using the crystallized glass substrate according to any one of the seventh to ninth aspect.

The crystallized glass containing a spinel type compound or solid solution thereof as a main crystal phase has been proposed in the past as a material having high mechanical strength in the application of information recording medium substrates or structural materials. However, it has previously been believed that higher degree of crystallinity is necessary for the crystallized glass to have higher mechanical strength. Therefore, crystal precipitates in the gahnite type crystallized glass proposed in the past have reached a level where visible light is not transmitted, and the specific gravity is as high as above 3.0. Accordingly, the glass is not suitable as a substrate for information recording medium of the next generation. Surface properties after polishing also do not satisfy requirements of a substrate for information recording medium of the next generation.

The crystallized glass substrate, which has been developed by the present inventors and application of which has been filed previously, was a substrate which is excellent in surface smoothness and also has high mechanical strength. However, the specific gravity thereof was at least 2.69, which was inferior to requirement of a substrate for information recording medium of the next generation.

The present inventors have found that definition of constitutional components of the crystallized glass enables significantly fine grain size of crystallites to be precipitated and appropriately inhibit the amount of the precipitated crystallites, thus obtaining a crystallized glass which has high mechanical properties and high surface smoothness after polishing while achieving significantly low specific gravity.

The crystallized glass of the present invention has a visual-light permeability equivalent with that of pre-crystallized glass (parent glass) from visual observation, and the precipitated crystal is sufficiently fine that a definite difference cannot be discerned between the two by appearance alone, and the degree of crystallinity is lower. Moreover, the substrate made of the crystallized glass of the present invention surprisingly exhibits remarkably higher values in Young's modulus and fracture toughness as compared to those of a substrate made of a pre-crystallized glass. The crystallized glass of the present invention can easily achieve surface properties having surface roughness Ra of less than 2 Å after polishing, and also polishing efficiency bears comparison with that of a glass material.

Moreover, the raw glass does not devitrify at 1,250° C. which corresponds to the molding temperature and at which the viscosity of molten glass is approximately 2.5 poises. It has also been found that the amount of precipitated crystals and their size can be easily controlled since crystal growth in the glass is very mild and the material is excellent in mass productivity.

The crystallized glass of the present invention can satisfy fracture toughness, Young's modulus and Vickers hardness, which are required of the substrate for information recording medium of the next generation, while having significantly low specific gravity of less than 2.63. The crystallized glass of the present invention exhibits satisfactory workability in the polishing process, and can achieve surface roughness Ra of less than 2 Å as surface properties after polishing.

Furthermore, it is possible to provide a crystallized glass which enables clarification without using an arsenic component or an antimony component, and suppression of generation of reboil when using a direct press process.

Since the crystallized glass of the present invention has high light transmittance of visible light and is capable of obtaining high smoothness after polishing, it can also be used as a substrate for packages that accommodate solid image pickup devices such as CCD and CMOS, a substrate suitable for a microarray in applications of electronic components and optical lens, a substrate used in flat displays, a substrate for mask blank used in the production of a transfer mask serving as an original plate of a circuit pattern of a semiconductor circuit, a cover substrate used to protect a display screen of mobile terminal apparatuses such as mobile phone and personal digital assistant (PDA), and a substrate for devices such as cover substrate of watches.

FIG. 1 is a curve which is obtained by differential thermal analysis (DTA) of raw glass of the crystallized glass disclosed in Patent Document 1. This is a curve having a shape characteristic of conventional crystallized glass containing a spinel type compound as a main crystal.

In the curve of FIG. 1, the portion 21 represents a glass transition point, which shows that a glass transition point of Patent Document 1 is higher. Therefore, when the raw glass of Patent Document 1 is pressed and molded into a disk-shaped substrate by a direct press process, the molding temperature of the glass during pressing must be high so as to prevent the generation of devitrification. However the glass viscosity is remarkably lowered during molding, therefore it is not easy to carry out a shear cut while assuring high productivity (e.g. 2 seconds or less of cycle time) and to press into a thickness of 1 mm or less.

Furthermore, portions 22, 23, 24 in the curve of FIG. 1 are respectively a first crystallizing peak, a second crystallizing peak, and a third crystallizing peak. These peaks have a feature of rapidly increasing. The rapid increase of the peaks means that crystals are rapidly precipitated once crystal precipitation begins.

In this way, the crystallized glass containing a spinel type compound as a main crystal proposed previously has a plurality of precipitation peaks and their increase is rapid. Consequently, it is very difficult to precipitate only the desired crystal phase as well as to control the degree of crystallinity and the crystal grain size with high reproducibility.

Particularly, in actual production of the substrate for information recording medium, crystallization by heat treatment is carried out by continuously moving a raw glass laid on a heat-stable mesh belt or roller within a tunnel type crystallization furnace. Detailed control of temperature condition is difficult in the crystallization furnace and, therefore, even if a fine crystal grain size and a low degree of crystallinity have been attained in a small furnace at a laboratory level, it is difficult to repeat them in an actual production step.

Furthermore, heat absorption and heat generation appear during an decrease in temperature at the portion 25 in the curve of FIG. 1. Heat absorption and heat generation during the decrease in temperature means that the glass significantly is likely to devitrify. From this reason, a considerable amount of heat and time is necessary in order to vitrify the devitrified glass again, thus a considerable amount of heat is necessary from batch charge to vitrification and the required time becomes longer, resulting in poor mass productivity.

On the other hand, the glass transition point obtained by differential thermal analysis (DTA) of the raw glass of the crystallized glass of the present invention is from 650° C. to 700° C. and is lower in temperature as compared with FIG. 1. Therefore, when the raw glass of the crystallized glass of the present invention is pressed into a disk-shaped substrate by a direct press process, it is easily pressed into a thickness of 1 mm or less while assuring high productivity (e.g. 2 seconds or less of cycle time) by virtue of satisfactory elongation of the glass during pressing. Only one crystallizing peak obtained by differential thermal analysis (DTA) appears in the crystallized glass of the present invention, and the increase is mild and the peak height is lower, and also the peak extends over a broad temperature range. This means that the grain size of the precipitated crystal and the amount of crystal precipitation can be easily controlled due to the mild crystal precipitation. Therefore, with the crystallized glass of the present invention, it is easy to lower the degree of crystallinity and to precipitate fine crystals.

These effects can be obtained more easily by adjusting overall the content of components which constitute the crystallized glass of the present invention. Particularly, these effects can be obtained more easily by including one or more components selected from $B_2O_3$ and $P_2O_5$ components.

BRIEF DESCRIPTION OF THE DRAWINGS

FIG. 1 is a curve which is obtained by differential thermal analysis (DTA) of raw glass of the crystallized glass disclosed in Patent Document 1.

DETAILED DESCRIPTION OF THE INVENTION

The crystallized glass of the present invention contains, as a crystal phase, one or more selected from $RAl_2O_4$ and $R_2TiO_4$ (wherein R is one or more selected from Mg and Fe).

The crystallized glass containing those as the crystal phase has a crystal of spinel type structure and thus excellent mechanical strength can be attained. Therefore, it is made possible to obtain well-balanced surface smoothness, specific gravity, Young's modulus, Vickers hardness, and mechanical strength such as fracture toughness which are required of the substrate for information recording medium of the next generation. In order to obtain these effects, the crystal is more preferably composed of a main crystal phase.

In the case of applications of the substrate for information recording medium, in order to obtain the effect with ease, average crystal grain size of the precipitated crystal is preferably from 0.5 nm to 20 nm, more preferably from 0.5 nm to 15 nm, and most preferably from 0.5 nm to 10 nm.

Similarly, in order to obtain the effect with ease, maximum grain size of the crystal phase is preferably 30 μm or less, more preferably 20 μm or less, and most preferably 15 μm or less.

As used herein, "crystal phase" is distinguished by an angle of a peak which appears in an X-ray diffraction pattern of X-ray diffraction, optionally using TEMEDX. Main crystal phase refers to a crystal phase which corresponds to an angle at highest peak intensity in X-ray diffraction pattern.

The "average crystal grain size" is defined as an average of longest distances between two parallel straight lines which sandwich crystals appearing in an image which is taken from an arbitrary site by a transmission electron microscope (TEM) at a magnification ratio of from 100,000 to 3,000,000. In this way, the number of n is 30.

The "maximum crystal grain size" is defined as a maximum value of longest distances between two parallel straight lines which sandwich crystals appearing in an image which is taken from an arbitrary site by a transmission electron microscope (TEM) at a magnification ratio of from 100,000 to 3,000,000. In this way, the number of n is 30.

Preferably, the crystallized glass of the present invention does not contain, as a main crystal phase, forsterite ($Mg_2SiO_4$), enstatite ($MgSiO_3$), magnesium aluminosillicate, or their solid solutions, which deteriorates polishing workability and degrades chemical resistance, and more preferably, the crystallized glass does not contain these crystals.

Similarly, preferably, the crystallized glass of the present invention does not contain, as a main crystal phase, β-quartz, β-eucryptite, α-cristobalite or their solid solutions, since it is impossible to obtain thermal expansion coefficient that is suitable as the substrate for information recording medium, and more preferably, the crystallized glass does not contain these crystals.

The substrate for information recording medium may induce deflection or generate vibration during high speed revolution if the specific gravity is larger even when the rigidity is merely higher. In addition, there arises a problem that power consumption increases due to an increase in weight. On the contrary, vibration may similarly generate if the rigidity is lower even if the specific gravity is lower. Furthermore, excessively lower specific gravity results in difficulty to obtain high mechanical strength.

Accordingly, in the substrate for information recording medium, apparently conflicting balance in properties must be attained so that specific gravity is lower although rigidity is higher.

For the purpose of enhancing the recording density and data transfer rate, a tendency toward high-speed rotation of the hard disk is advanced. Accordingly, a problem such as deflection of the substrate has become more prominent, and thus a substrate with high stiffness and low specific gravity, for information recording medium, is now needed more than ever before.

In recent years, since hard disk have often been employed in applications where dynamic use is envisaged, it is preferable that the substrate has high Young's modulus and surface hardness such that the substrate sufficiently withstands it.

From the above viewpoint, Young's modulus of the crystallized glass of the present invention is preferably 85 GPa or more, more preferably 88 GPa or more, and most preferably 90 GPa or more. The crystallized glass of the present invention can attain the Young's modulus in the range mentioned above.

From the above viewpoint, specific gravity will be described similarly. The specific gravity of the crystallized glass of the present invention is preferably less than 2.63, more preferably 2.60 or less, and most preferably 2.57 or less. On the other hand, when the specific gravity is less than 2.42, the substrate with the desired rigidity is unobtainable within the compositional range of the present invention and, therefore, the specific gravity is preferably 2.42 or more. The crystallized glass of the present invention can attain the specific gravity of the range mentioned above.

From the viewpoint of a balance between the rigidity and specific gravity, the value represented by Young's modulus [GPa]/specific gravity (specific elastic modulus) is preferably 31.4 or more, more preferably 32.0 or more, and most preferably 33 or more. Since the specific elastic modulus is preferably as high as possible, the value of the upper limit is not particularly limited.

In the crystallized glass of the present invention, it is possible to obtain the value of specific elastic modulus, which is more than that mentioned above.

The value $K_{1C}$ of the fracture toughness is preferably 1.0 or more, more preferably 1.1 or more, and most preferably 1.2 or more so as to apply as a substrate for information recording medium of the next generation. The crystallized glass of the present invention has the value of fracture toughness, which is more than that mentioned above.

The value obtained by the SEPB method (JIS R1607) is used as the value of fracture toughness ($K_{1C}$).

The components constituting the crystallized glass of the present invention will be described below.

As used herein, when the components constituting the crystallized glass are mentioned, the contents of the components are indicated by % by mass on an oxide basis unless otherwise specified.

The term "on an oxide basis" as used herein is concerned with a method for expressing the composition of each of the components to be contained in the crystallize glass and express the amount of each of the components to be contained in the crystallized glass relative to 100% by mass of the total sum of the mass of this formed oxide, on the assumption that oxides, carbonic acid salts, and the like used as raw materials of the constitutional components of the crystallized glass of the present invention are entirely decomposed during melting, thus converted into the expressed oxides.

The oxide of Fe includes, for example, $FeO$, $Fe_3O_4$, and $Fe_2O_3$. Regarding the component having some chemical formulas according to the valence of cations, it is expressed in terms of one chemical formula as used herein. For example, oxide of Fe is expressed in terms of $FeO$ herein.

A $SiO_2$ component is an essential component which forms a glass network structure to thereby improve chemical stability and achieve lower specific gravity. When the content thereof is less than 50%, the resulting glass may have poor chemical resistance and also the specific gravity may increase along with an increase in the contents of other components. Therefore, the lower limit of the content of the $SiO_2$ component is preferably 50%, more preferably 51%, and most preferably 52% so as to improve chemical resistance and to realize low specific gravity. Furthermore, when the content of the $SiO_2$ component is more than 70%, dissolution and press molding are likely to be difficult along with an increase in viscosity, and the material uniformity and the clarifying effect is likely to deteriorate. Therefore, the upper limit of the content of the $SiO_2$ component is preferably 70%, more preferably 67%, and most preferably 65% so as to enhance direct press moldability and to improve uniformity and clarifying effect of the material.

An $Al_2O_3$ component is one of components, which forms the glass network structure like $SiO_2$, and which constitutes the crystal phase through the heat treatment of raw glass, and is an important component which contributes to stabilize raw glass and to improve chemical resistance, but the effect is poor when the content is less than 10%. The lower limit of the content of the $Al_2O_3$ component is preferably 10%, more preferably 11%, and most preferably 12.8% so as to stabilize the glass and to improve chemical resistance, and to lower specific gravity. To the contrary, when the content of the $Al_2O_3$ component is more than 26%, meltability, moldability, and devitrification resistance deteriorate, and also uniformity and clarifying effect are likely to deteriorate, resulting in poor balance with other components, and thus fails to obtain a crystallized glass of the present invention. From the viewpoint of a balance with the content of the $SiO_2$ component, when the content of the $Al_2O_3$ component is more than 26%, it becomes impossible to obtain high mechanical strength. Therefore, the upper limit of the content of the $Al_2O_3$ component is preferably 26%, more preferably 24%, and most preferably 23% so as to improve meltability, moldability, devitrification resistance, and mechanical strength.

The MgO component is one of components, which constitutes a crystal phase required to the present invention. The MgO component is a component which contributes to lower the specific gravity and to improve Young's modulus of the crystallized glass, and is also an essential component which is effective to lower the viscosity of the glass. The lower limit of the content of the MgO component is preferably 2.5%, more preferably 5%, and most preferably 7% so as to lower the specific gravity and to improve Young's modulus of the crystallized glass.

To the contrary, when the content of the MgO component is more than 25%, not only the desired glass is unobtainable due to higher specific gravity of the raw glass but also insoluble matters may precipitate to the raw glass. Also, mass productivity deteriorates during direct pressing due to an increase in viscosity of raw glass. Accordingly, the upper limit of the content of the MgO component is preferably 25%, more preferably 18%, and most preferably 15% so as to lower the specific gravity of the glass and to prevent precipitation of the undissolved substance, and to improve mass productivity during direct pressing.

In the present invention, in order to obtain the desired crystal phase while realizing low specific gravity of the glass, it is necessary to adjust the value of a ratio of the total mass content of $Al_2O_3$ and MgO to the mass content of $SiO_2$, namely the value of $(Al_2O_3+MgO)/SiO_2$ in a range of 0.30 or more and 0.65 or less, expressed on oxide basis.

In order to make it easier to obtain the effect, the lower limit of the value of $(Al_2O_3+MgO)/SiO_2$ is more preferably 0.32, and most preferably 0.35. Similarly, the upper limit of the value of $(Al_2O_3+MgO)/SiO_2$ is more preferably 0.62, and most preferably 0.58.

The $TiO_2$ component is an essential component which plays a role in forming nuclei to precipitate a spinel type compound, and which contributes to increase Young's modulus and to lower the viscosity, and to improve chemical resistance of the crystallized glass. The $TiO_2$ component is one of components which constitute an $R_2TiO_4$ crystal phase. In addition, the $TiO_2$ component has the effect of clarifying raw glass, and inclusion of the $TiO_2$ component can exert the effect of clarifying the raw glass without containing a clarifying component such as $As_2O_3$, $Sb_2O_3$, $CeO_2$, or SnO. In order to obtain the effect, the lower limit of the content of the $TiO_2$ component is preferably 1%, more preferably 2%, and most preferably 2.8%.

To the contrary, when the content of $TiO_2$ component is more than 15%, the specific gravity of glass increases and vitrification comes to difficult, and thus the upper limit of the content of the $TiO_2$ component is preferably 15%, more preferably 11%, and most preferably 8%.

The ZnO component is an optional component which contributes to improve Young's modulus of the crystallized glass and is also effective to lower viscosity of the glass.

To the contrary, when the content of ZnO component is 2% or more, specific gravity of the crystallized glass increases. Accordingly, the upper limit of the content of the ZnO component is preferably less than 2%, more preferably 1%, and most preferably zero.

The upper limit of the total of the ZnO component and the MgO component is preferably 15%, and more preferably 14.3% so as to make it easier to realize low specific gravity. The lower limit of the total of the ZnO component and the MgO component is preferably 3% so as to obtain the desired Young's modulus.

The FeO component is one of components which constitute a crystal phase, and can be optionally contained. It is also a compound which acts as a clarifying agent. To the contrary, the FeO component causes alloying of platinum used in a glass melting device. In order to prevent alloying, the upper limit of the content of the FeO component is preferably 8%, more preferably 6%, and most preferably 4%.

The CaO component is a component which contributes to lower the specific gravity and to increase Young's modulus of the glass and is also effective to lower the viscosity of glass. Therefore, it can be added as an optional component.

To the contrary, when the content of the CaO component is more than 1%, the desired crystallized glass is unobtainable due to higher specific gravity of the crystallized glass. Accordingly, the upper limit of the content of the CaO component is preferably 1%, more preferably 0.5%, and most preferably zero.

The BaO or SrO component is a component which is effective to lower the viscosity of raw glass and to improve chemical resistance and mechanical strength of the crystallized glass. Therefore, it can be added as an optional component.

To the contrary, when the BaO or SrO component is more than 1%, specific gravity of the glass may increase and, therefore, each upper limit of the content is preferably 1%, and most preferably zero.

In order to adjust specific gravity of the crystallized glass to less than 2.63 to thereby realize easy retaining of precipitation of the desired crystal phase, the upper limit of the total of the components of CaO, SrO, BaO, and $Y_2O_3$ is preferably 1%, and more preferably these components are not included.

A $ZrO_2$ component is a component, similarly as the $TiO_2$ component, which plays a role of forming nuclei to precipitate the main crystal phase and a component which contributes to increase Young's modulus and to improve chemical resistance of the glass. Therefore, it can be added as an optional component.

To the contrary, when the addition amount of the $ZrO_2$ component is more than 1.9%, unmolten residues and $ZrSiO_4$ (zircon) are likely to be generated during melting of the glass, and also specific gravity of the glass increases. Accordingly, the upper limit of the content of the $ZrO_2$ component is preferably 1%, and more preferably 0.7%.

A $B_2O_3$ component contributes to lower the viscosity of glass and improves meltability and moldability. Therefore, it can be added as an optional component. Additionally, the $B_2O_3$ component can suppress excessive crystal growth from the inside of glass and thus can precipitate a desired crystal phase inside the glass as fine particles in the order of a few micrometers uniformly. Therefore, it is preferred to include the $B_2O_3$ component. In this case, the lower limit of the content of the $B_2O_3$ component is more preferably 0.5%, and most preferably 1.0%.

To the contrary, when the content of the $B_2O_3$ component is more than 12%, it becomes difficult to satisfy mechanical properties due to deterioration of chemical resistance, resulting in excessive suppression of precipitation of the desired crystal. Besides, raw glass is likely to cause phase separation and it becomes difficult to vitrify. Therefore, the upper limit of the content of the $B_2O_3$ component is preferably 12%, and more preferably 9%.

A $P_2O_5$ component exerts the effect to suppress crack propagation of the crystallized glass thus can contribute to raise Vickers hardness. Besides, it contributes to lower the viscosity and can improve meltability and clarifying ability of raw glass under coexistence with $SiO_2$. The $P_2O_5$ component can suppress excessive crystal growth from the inside of glass and thus can precipitate a desired crystal phase inside the glass as fine particles in the order of a few micrometers uniformly. In order to obtain these effects, it is possible to optionally contain the $P_2O_5$ component. When the $P_2O_5$ component is added excessively, it becomes difficult to cause vitrification and devitrification or phase separation is likely to occur. Therefore, the upper limit of the content of the $P_2O_5$ component is preferably 7%, more preferably 5%, and most preferably 3%.

The $R'_2O$ component (wherein R' is one or more selected from Li, Na, and K) is a component which lowers the viscosity, improves moldability, and improves uniformity of glass and, therefore, it can be optionally contained. When the $R'_2O$ component is included, alkaline metal ions on the surface are exchanged after molding a substrate to form a compression stress layer on the surface, thus enabling an increase in mechanical strength. When the content of the $R'_2O$ component (total of the components of $Li_2O$, $Na_2O$, and $K_2O$) is less than 1%, the effect cannot be obtained. In order to obtain the effect, the lower limit of the content of the $R'_2O$ component is more preferably 1%, and most preferably 2%.

It is necessary for the substrate for information recording medium to restrict elution of an alkaline metal component on the surface. Therefore, it is necessary to decrease the amount of the $R'_2O$ component in the crystallized glass as small as possible. From the above viewpoint, the upper limit of the content of the $R'_2O$ component is preferably 15%, more preferably 9%, still more preferably 8%, and most preferably 7%.

The $Li_2O$ component is a component which can be optionally contained. However, a large content makes it difficult to obtain the desired crystal phase, resulting in significant elution on the surface. Accordingly, the upper limit of the content of the $Li_2O$ component is preferably 2%, more preferably 0.9%, and most preferably zero.

The $Na_2O$ component is a component which can be optionally contained. However, a large content makes it difficult to obtain the desired crystal phase. Accordingly, the upper limit of the content of the $Na_2O$ component is preferably 10%, more preferably 9%, and most preferably 8%.

$Na_2O$ component is a component which is unlikely to exert an adverse affect such as excessive crystal precipitation when precipitating the desired crystal phase, as compared to other alkaline components. When chemical strengthening is performed by ion exchange, it is effective to include the $Na_2O$ component in the crystallized glass and to exchange $Na^+$ ions in the crystallized glass by $K^+$ ions, so as to form a compression stress layer. Accordingly, in order to make it easier to precipitate the desired spinel type crystal and to perform chemical strengthening by ion exchange, the crystallized glass more preferably contains the $Na_2O$ component in the amount of more than 2%, and most preferably 3% or more.

The $K_2O$ component is a component which can be optionally contained. However, a large content makes it difficult to obtain the desired crystal phase, and thus it may not be included. In order to obtain the effect as for the $R'_2O$ component, it may be included within a range where the desired crystal phase is precipitated, and the upper limit thereof is preferably 8%, more preferably 7%, and most preferably 6.5%.

The $Cs_2O$ component is expensive as for the cost of raw material and is a component difficult to undergo chemical strengthening due to a larger ionic radius, thus is preferably not included.

The crystallized glass of the present invention contains, as main clarifying component, one or more components selected from a $SnO_2$ component and $CeO_2$ component, and thus high clarifying effect is exerted.

In order to obtain high clarifying effect, the lower limit of the content of the $SnO_2$ component, the $CeO_2$ component, or the total of both components is preferably 0.01%, more preferably 0.1%, and most preferably 0.15%, expressed on an oxide basis.

In order to lower the specific gravity while maintaining mechanical strength and to obtain high clarifying effect, and to enhance the effect of suppressing reboil during direct pressing, the upper limit of the content of one or more selected from a $SnO_2$ component and a $CeO_2$ component is preferably 1%, more preferably 0.7%, and most preferably 0.5%.

However, as mentioned above, since the crystallized glass of the present invention is capable of obtaining sufficient clarifying effect even by $TiO_2$ component because of its chemical compositional feature, $SnO_2$, $CeO_2$, and the like may be not included as a clarifying component. In recent years, prices of $CeO_2$ components have increased, and thus the effect of suppressing the production cost of the crystallized glass is obtained when these components are not included.

The $As_2O_3$ and $Sb_2O_3$ components, and $Cl^-$, $NO^-$, $SO^{2-}$ and $F^-$ components act as a clarifying agent but are components which might be environmentally harmful, and thus use thereof should be avoided. The glass of the present invention is capable of obtaining the clarifying effect without including an $As_2O_3$ component or $Sb_2O_3$ component. When these components and a clarifying agent component in the present invention are added together, clarifying effects of both clarifying agents cancel each other out.

Since the PbO component is environmentally harmful and also causes an increase in specific gravity of glass, it is not preferably included. The glass of the present invention prevents excessive precipitation of crystals without including the PbO component, and is also satisfactory in improvement of meltability and glass stability during molding.

The $Gd_2O_3$, $La_2O_3$, $Y_2O_3$, $Nb_2O_5$, $Ga_2O_3$, $WO_3$, $Ta_2O_5$ and $Bi_2O_3$ components contribute to lower viscosity and to improve Young's modulus of the glass, and to improve mechanical properties and heat resistance. Therefore, they can be added as optional components. However, an increase in addition amount causes an increase in specific gravity and an increase in cost of raw materials. Accordingly, 3% will suffice for the upper limit of the total amount of one or more of these components. When the total amount is more than 3%, it becomes impossible to satisfy the specific gravity and Young's modulus. The upper limit of the total amount of these components is preferably 3%, more preferably 2%, and most preferably these components are not included.

The components such as V, Cu, Mn, Cr, Co, Mo, Ni, Te, Pr, Nd, Er, Eu and Sm used as a coloring component of glass can be added so that the kind of glass is distinguished by utilizing fluorescence properties due to each component so that mixing with other kinds of glasses in a factory is prevented. However, the addition of these components causes an increase in specific gravity, an increase in cost of raw materials and deterioration of glass-forming ability. Thus, 3% or less will suffice for the total amount of one or more of these components expressed on an oxide basis. The upper limit of the total amount of these components is preferably 3%, more preferably 2%, and most preferably these components are not included if coloring is not required.

When various substrates such as a substrate for information recording medium is produced, a compression stress layer can be formed on a substrate surface after or during polishing, thus enabling an increase in mechanical strength. In the case of the crystallized glass, in addition to high mechanical properties due to precipitated crystals, a compression stress layer is formed on a surface layer, thus obtaining higher strength.

The method for forming a compression stress layer includes, for example, a chemical strengthening method in which an alkaline component existing in a surface layer of a crystallized glass substrate before formation of the compression stress layer is exchange reacted with an alkaline component lager than an ionic radius. The method also includes a heat strengthening method in which a crystallized glass substrate is heated and then quenched, and an ion injection method in which ions are injected into a surface layer of a crystallized glass substrate.

The chemical strengthening method can be carried out by the following steps. A crystallized glass substrate is immersed in a salt containing potassium or sodium, for example, a molten salt prepared by heating potassium nitrate (KNO), sodium nitrate ($NaNO_3$) or a complex salt thereof at 300 to 600° C. for 0.1 to 12 hours. Thereby, the exchange reaction between a lithium component ($Li^+$ ions) or a sodium component ($Na^+$ ions) existing in a glass phase in the vicinity of a substrate surface and a sodium component ($Na^+$ ions) or a potassium component ($K^+$ ions), which is an alkaline component having a larger ionic radius than that of the above component, proceeds. As a result, compression stress is generated in a surface layer of a glass substrate.

The crystallized glass of the present invention can obtain sufficient strength, like a compression stress layer formed by chemical strengthening, even if the thickness of the compression stress layer of main surface is less than 30 μm, and also can nearly maintain the strength up to the thickness of 5 μm.

Using a glass surface stress meter, the compression stress layer is subjected to the measurement. The glass surface stress meter is an apparatus in which a depth of surface stress and a stress value are measured by light propagation along a surface of the glass using the photoelastic effect. For example, it is possible to use a glass surface stress meter FSM-6000LE manufactured by Luceo Co., Ltd.

The thermal strengthening method, which is not specifically limited, is exemplified by the method of heating the crystallized glass substrate to from 300° C. to 600° C. followed by a rapid cooling such as of water and/or air cooling. Thereby, the compression stress layer can be formed by the difference of temperatures between the surface and the inside of the glass substrate. In addition, the compression stress layer can be formed more efficiently by combining with the chemical treatment method mentioned above.

The crystallized glass of the present invention, and the crystallized glass substrate for information recording medium are specifically produced by the following method.

Initially, the raw materials such as oxides, carbonates, and nitrates are mixed to include the components to constitute the glass in the compositional range mentioned above, and then the mixture is melted by a usual melting device using a crucible of platinum, quartz, etc. at a temperature where the viscosity of glass melt is from 1.5 to 3.0 dPa·s.

Then, the temperature of glass melt is raised to a temperature where the viscosity is from 1.0 to 2.3 dPa·s, preferably from 1.2 to 2.2 dPa·s, and bubbles are generated within the glass melt to induce a stirring effect and uniformity of the glass melt is enhanced.

Thereafter, the temperature of the glass melt is lowered to a temperature where the viscosity is from 1.8 to 2.6 dPa·s, preferably from 2.0 to 2.5 dPa·s, and bubbles generated inside the glass are eliminated and clarifying is performed. Then, the temperature is maintained.

The resulting molten glass is cast in a mold and formed into a desired disk shape.

When a substrate for information recording medium is produced, molten glass is preferably molded by the following method.

The molten glass, prepared under the conditions mentioned above, is dropped in a lower mold and the molten glass is pressed by an upper and lower mold to thereby form into a disk shape of a thickness of about from 0.7 mm to 1.2 mm (direct press).

Specifically, the temperature of upper mold of the press shaping mold is set at 300±100° C., preferably 300±50° C., and the temperature of lower mold is set at glass Tg±50° C., and preferably glass Tg±30° C.

The temperature of a glass flow pipe to direct the molten glass from a crucible to the press shaping mold is set at a temperature where the viscosity of the glass is from 2.0 to 2.6 dPa·s, preferably from 2.1 to 2.5 dPa·s. The molten glass is dropped in the lower mold in a predetermined amount, and the upper mold and the lower mold are made to come close to each other, and then pressed to obtain a disk-shaped glass shaped body.

In the production of the substrate for information recording medium, cost reduction is required per one substrate. Therefore, the press is performed at high speed such as from 150 to 700 mm/sec of press speed and from 1 to 2 seconds of cycle time (time from starting a press to starting the next press). Even under the impact during pressing, the generation of reboil during pressing can be suppressed by using the crystallized glass of the present invention and controlling the temperatures of glass melt and the temperatures of production devices as mentioned above.

Besides, the substrate for information recording medium can be produced by the method of slicing a glass body formed into a column shape, the method of cutting out a glass sheet, prepared by a float method, into a circular shape, and the like. The production by the direct press is most preferable in view of production efficiency.

Then, the resulting disk-shaped glass is subjected to a heat treatment to thereby precipitate crystals uniformly inside the glass. It is preferred that the heat treatment is performed at two stage temperatures. Namely, a nucleus formation step is performed by heat-treating at a first temperature and then a crystal growth step is performed by heat-treating at a second temperature higher than that of the nucleus formation step.

The nucleus formation step and the crystal growth step may be continuously performed by heat-treating at single stage temperature. Namely, the temperature may be raised to a predetermined crystallization temperature and, after reaching the crystallization temperature, the temperature may be maintained at the temperature for a fixed hour, followed by temperature drop.

It is preferred that, in the crystallizing step, a disk-shaped ceramic setter and a disk-shaped glass are alternatively stacked, followed by sandwiching of the glasses by the setters (number of setters is number of glasses plus one) in view of enhancing the flatness of the disk.

The preferable conditions of a heat treatment to attain the desired grain size and degree of crystallinity of the crystallized glass of the present invention are as follows.

Maximum temperature of the first heat treatment is preferably from 650° C. to 750° C. The first heat treatment may be omitted. Maximum temperature of the second stage heat treatment is preferably from 670° C. to 850° C.

The retention time of the first temperature is preferably from 0 minute to 300 minutes, and most preferably from 0 minute to 180 minutes.

The retention time of the second temperature is preferably from 60 minutes to 600 minutes, and most preferably from 120 minutes to 420 minutes.

The temperature raising rate to the first temperature is preferably from 10° C./minute to 200° C./minute. The temperature raising rate to the second temperate from the first temperature is preferably from 5° C./minute to 100° C./minute. When a heat treatment is performed only at the second temperature, the temperature raising rate is also the same. After passing the retention time at the second temperature, the temperature is dropped at 10° C./hour to 50° C./hour, and more preferably 10° C./hour to 30° C./hour.

When a heat treatment is performed only at the single stage temperature, since the desired crystal phase is precipitated, the crystallization temperature is preferably from 700° C. to 800° C., and more preferably from 720° C. to 770° C. The retention time of the crystallization temperature is preferably from 0 minute to 500 minutes, and more preferably from 120 minutes to 300 minutes since the desired crystal phase is precipitated. The retention time of 0 minute means that temperature drop is initiated within 1 minute after reaching the crystallization temperature.

Next, shaping processes such as hole cutting at a central portion and edge grinding and polishing at outer periphery and inner periphery may be applied, and a lapping or polishing process may be applied to main surface by a publicly known process using a double side machining device.

The conventional crystallized glass containing gahnite as a main crystal phase has a higher hardness. Therefore, free abrasive grains with a higher hardness such as zirconia, alumina, and diamond grains are necessary when the main surface undergoes mirror polishing, and a longer time is also necessary for the processing time. Additionally, scratches tend to generate at the finished surface since the free abrasive grains with a higher hardness are used, and it is therefore very difficult to obtain a surface property in terms of Ra of 2 Å or less.

The crystallized glass substrate of the present invention can be polished using inexpensive free abrasive grains such as colloidal silica, cerium oxide, and zircon ($ZrSiO_4$), and the processing time may be short (from 30 to 90 minutes). In accordance with the crystallized glass of the present invention, the surface property in terms of Ra of 2 Å or less can be attained by using currently established processing methods such as polishing.

Furthermore, even when being cleaned using acid or alkaline, e.g. hydrofluoric acid, for removing residual abradants at polishing processes, the surface property in terms of Ra of 2 Å or less can be maintained.

EXAMPLES

Preferred Examples of the present invention will be described below.

Each batch of raw materials of oxides, carbonates, etc. were mixed and the mixture was sufficiently melted in a platinum crucible at a temperature of about 1,250° C. to 1,450° C. so as not to generate molten residues. Then, the temperature was raised to a temperature of about 1,350° C. to 1,500° C., and dropped to the temperature of 1,450° C. to 1,250° C. to thereby eliminate bubbles generated inside the glass and to perform clarifying.

Thereafter, a predetermined amount of the glass was flowed out while being maintained the temperature; and a glass shaped body was obtained in a direct press system by setting the temperature of upper mold at 300±100° C. and the temperature of lower mold at Tg±50° C., and molding the glass into a disk shape using these upper and lower molds followed by cooling. With regard to one composition, 100 shaped bodies were produced by press molding.

Several of the obtained glass shaped bodies were stacked whilst sandwiching ceramic setters, and were subjected to further single stage heat treatment for crystallization.

Next, shaping processes such as hole cutting at a central portion, edge grinding and polishing at outer periphery and inner periphery may be applied, and lapping or polishing process may be applied to main surface of the heat-treated crystallized glass shaped body by the method mentioned above, followed by washing with hydrofluoric acid for removing a polishing agent to obtain a substrate for information recording medium.

The surface roughness Ra (arithmetic average roughness) of the obtained substrate was entirely 2 Å or less in this stage. The surface roughness Ra (arithmetic average roughness) was measured by an atomic force microscope (AFM).

Tables 1 to 27 show composition of crystallized glass (% by mass), main crystal phase, crystallization temperature, retention time (minute) at crystallization temperature, specific gravity after crystallization, Vickers hardness [Hv], Young's modulus [E], average crystal grain size (nm), maximum crystal grain size (nm), and surface roughness Ra (Å) after polishing of Examples 1 to 128 and Comparative Examples 1 to 3.

Each value of physical properties is the value determined by the measurement of a sample chosen at random from a plurality of samples.

The specific gravity was measured using Archimedes method and the Young's modulus was measured using an ultrasonic method.

Vickers hardness indicates a value obtained by dividing the load (N) of when a pyramid shaped recess is impressed on a test surface by pressing a four-sided pyramid diamond indenter with a face-to-face angle of 136° by a surface area (mm$^2$) which is calculated from the length of an impressed recess. Using a microhardness tester MVK-E manufactured by Akashi Seisakusho Co., Vickers hardness was measured under a test load of 4.90 (N) for a retention time of 15 (seconds).

TABLE 1

| | Example No. (% by mass) | | | | |
|---|---|---|---|---|---|
| | 1 | 2 | 3 | 4 | 5 |
| $SiO_2$ | 53.75 | 53.75 | 53.75 | 58.25 | 58.5 |
| $Al_2O_3$ | 17.5 | 22.5 | 20 | 17.5 | 17.5 |
| $TiO_2$ | 5.5 | 5.5 | 8 | 5.5 | 5 |
| MgO | 13 | 8 | 8 | 8 | 14 |
| FeO | | | | | |
| ZnO | | | | | |
| $Li_2O$ | | | | 0.5 | 1 |
| $K_2O$ | | | | | |
| $Na_2O$ | 4 | 4 | 4 | 4 | 4 |
| CaO | 1 | 1 | 1 | 1 | |
| SrO | | | | | |
| BaO | | | | | |
| $P_2O_5$ | 1.25 | 1.25 | 1.25 | 1.25 | |
| $B_2O_3$ | 4 | 4 | 4 | 4 | |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.57 | 0.57 | 0.52 | 0.44 | 0.54 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 770 | 770 | 770 | 750 |
| Retention time (minute) | 300 | 300 | 250 | 350 | 200 |
| Specific gravity after crystallization | 2.568 | 2.539 | 2.571 | 2.531 | 2.597 |
| Young's modulus E (GPa) | 92 | 89 | 91 | 89 | 99 |
| Vickers hardness (Hv) | 680 | 670 | 680 | 680 | 700 |
| Average crystal grain size (nm) | 7 | 7 | 10 | 10 | 5 |
| Maximum crystal grain size (nm) | 10 | 9 | 15 | 17 | 8 |
| Ra (Å) | 1.3 | 0.8 | 1.9 | 1.1 | 1.8 |

TABLE 2

| | Example No. (% by mass) | | | | |
|---|---|---|---|---|---|
| | 6 | 7 | 8 | 9 | 10 |
| $SiO_2$ | 61 | 56.3 | 57.25 | 58.8 | 58.8 |
| $Al_2O_3$ | 15 | 17.5 | 17.5 | 17.5 | 15 |
| $TiO_2$ | 5 | 5.2 | 5.2 | 5.2 | 5.2 |
| MgO | 14 | 13 | 9.8 | 10.5 | 13 |
| FeO | | | | | |
| ZnO | | | | | |
| $Li_2O$ | 1 | | | | |
| $K_2O$ | | | | | |
| $Na_2O$ | 4 | 4 | 4 | 4 | 4 |
| CaO | | | | 1 | |
| SrO | | | | | |
| BaO | | | | | |
| $P_2O_5$ | | | 1.25 | | 4 |
| $B_2O_3$ | | 4 | 4 | 4 | |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |

TABLE 2-continued

|  | Example No. (% by mass) | | | | |
| --- | --- | --- | --- | --- | --- |
|  | 6 | 7 | 8 | 9 | 10 |
| (Al$_2$O$_3$ + MgO)/SiO$_2$ | 0.48 | 0.54 | 0.48 | 0.48 | 0.48 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 730 | 770 | 750 | 750 |
| Retention time (minute) | 180 | 480 | 60 | 0 | 300 |
| Specific gravity after crystallization | 2.579 | 2.563 | 2.516 | 2.510 | 2.542 |
| Young's modulus E (GPa) | 96 | 92 | 89 | 88 | 90 |
| Vickers hardness (Hv) | 700 | 680 | 670 | 680 | 690 |
| Average crystal grain size (nm) | 6 | 4 | 7 | 8 | 6 |
| Maximum crystal grain size (nm) | 10 | 7 | 11 | 13 | 10 |
| Ra (Å) | 1.9 | 0.9 | 1.8 | 1.9 | 1.6 |

TABLE 3

|  | Example No. (% by mass) | | | | |
| --- | --- | --- | --- | --- | --- |
|  | 11 | 12 | 13 | 14 | 15 |
| SiO$_2$ | 58.8 | 58.57 | 58.57 | 58.75 | 58.8 |
| Al$_2$O$_3$ | 15 | 14.94 | 14.94 | 14.98 | 13 |
| TiO$_2$ | 5.2 | 5.18 | 5.18 | 5.2 | 5.2 |
| MgO | 13 | 12.95 | 12.95 | 12.98 | 13 |
| FeO |  |  |  |  |  |
| ZnO |  |  |  |  |  |
| Li$_2$O |  |  |  |  |  |
| K$_2$O |  |  |  |  |  |
| Na$_2$O | 4 | 3.98 | 3.98 | 4 | 6 |
| CaO |  |  |  |  |  |
| SrO |  |  |  |  |  |
| BaO |  |  |  |  |  |
| P$_2$O$_5$ |  |  |  |  |  |
| B$_2$O$_3$ | 4 | 3.98 | 3.98 | 4 | 4 |
| ZrO$_2$ |  |  |  |  |  |
| CeO$_2$ |  | 0.4 | 0.4 |  |  |
| Sb$_2$O$_3$ |  |  |  | 0.09 |  |
| Y$_2$O$_3$ |  |  |  |  |  |
| CuO |  |  |  |  |  |
| Total | 100 | 100 | 100 | 100 | 100 |
| (Al$_2$O$_3$ + MgO)/SiO$_2$ | 0.48 | 0.48 | 0.48 | 0.48 | 0.44 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 730 | 750 | 750 |
| Retention time (minute) | 360 | 300 | 240 | 480 | 120 |
| Specific gravity after crystallization | 2.529 | 2.539 | 2.536 | 2.532 | 2.524 |
| Young's modulus E (GPa) | 89 | 90 | 90 | 89 | 85 |
| Vickers hardness (Hv) | 690 | 700 | 690 | 660 | 640 |
| Average crystal grain size (nm) | 5 | 5 | 6 | 6 | 6 |
| Maximum crystal grain size (nm) | 8 | 9 | 10 | 10 | 10 |
| Ra (Å) | 0.8 | 1.0 | 1.1 | 1.2 | 1.4 |

TABLE 4

|  | Example No. (% by mass) | | | | |
| --- | --- | --- | --- | --- | --- |
|  | 16 | 17 | 18 | 19 | 20 |
| $SiO_2$ | 58.8 | 58.8 | 58.8 | 61.8 | 61.8 |
| $Al_2O_3$ | 15 | 14.5 | 15 | 12 | 15 |
| $TiO_2$ | 5.2 | 5.2 | 5.2 | 5.2 | 5.2 |
| MgO | 13 | 13 | 13 | 13 | 10 |
| FeO |  |  |  |  |  |
| ZnO |  |  |  |  |  |
| $Li_2O$ |  | 0.5 |  |  |  |
| $K_2O$ |  |  |  |  |  |
| $Na_2O$ | 4 | 4 | 4 | 4 | 4 |
| CaO |  |  |  |  |  |
| SrO |  |  |  |  |  |
| BaO |  |  |  |  |  |
| $P_2O_5$ |  |  |  |  |  |
| $B_2O_3$ | 4 | 4 | 4 | 4 | 4 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.48 | 0.47 | 0.48 | 0.40 | 0.40 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 730 | 730 | 730 | 750 | 750 |
| Retention time (minute) | 300 | 300 | 240 | 300 | 240 |
| Specific gravity after crystallization | 2.523 | 2.550 | 2.523 | 2.501 | 2.481 |
| Young's modulus E (GPa) | 89 | 91 | 91 | 87 | 87 |
| Vickers hardness (Hv) | 680 | 690 | 700 | 660 | 660 |
| Average crystal grain size (nm) | 4 | 3 | 4 | 5 | 5 |
| Maximum crystal grain size (nm) | 9 | 7 | 8 | 10 | 8 |
| Ra (Å) | 1.2 | 0.8 | 0.7 | 1.1 | 1.4 |

TABLE 5

|  | Example No. (% by mass) | | | | |
| --- | --- | --- | --- | --- | --- |
|  | 21 | 22 | 23 | 24 | 25 |
| $SiO_2$ | 58.8 | 61.8 | 58.8 | 58.8 | 58.8 |
| $Al_2O_3$ | 18 | 13 | 16.8 | 18 | 17.8 |
| $TiO_2$ | 5.2 | 5.2 | 5.2 | 4 | 5.2 |
| MgO | 10 | 10 | 10 | 10 | 10 |
| FeO |  |  |  |  |  |
| ZnO |  |  |  |  |  |
| $Li_2O$ |  |  |  |  |  |
| $K_2O$ |  |  |  |  |  |
| $Na_2O$ | 4 | 6 | 5 | 5 | 4 |
| CaO |  |  |  |  |  |
| SrO |  |  |  |  |  |
| BaO |  |  |  |  |  |
| $P_2O_5$ |  |  |  |  |  |
| $B_2O_3$ | 4 | 4 | 4 | 4 | 4 |
| $ZrO_2$ |  |  |  |  |  |
| $CeO_2$ |  |  | 0.2 | 0.2 | 0.2 |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.48 | 0.37 | 0.46 | 0.48 | 0.47 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 770 | 750 | 770 | 750 |

TABLE 5-continued

|  | Example No. (% by mass) | | | | |
| --- | --- | --- | --- | --- | --- |
|  | 21 | 22 | 23 | 24 | 25 |
| Retention time (minute) | 300 | 240 | 300 | 300 | 300 |
| Specific gravity after crystallization | 2.503 | 2.479 | 2.525 | 2.508 | 2.509 |
| Young's modulus E (GPa) | 89 | 90 | 88 | 89 | 90 |
| Vickers hardness (Hv) | 690 | 670 | 700 | 680 | 690 |
| Average crystal grain size (nm) | 5 | 5 | 5 | 6 | 6 |
| Maximum crystal grain size (nm) | 8 | 9 | 9 | 10 | 11 |
| Ra (Å) | 1.8 | 1.1 | 1.3 | 0.8 | 1.1 |

TABLE 6

|  | Example No. (% by mass) | | | | |
| --- | --- | --- | --- | --- | --- |
|  | 26 | 27 | 28 | 29 | 30 |
| $SiO_2$ | 58.8 | 58.8 | 58.8 | 57.55 | 58.8 |
| $Al_2O_3$ | 17 | 16.8 | 16.6 | 17 | 15.75 |
| $TiO_2$ | 5.2 | 5.2 | 5.2 | 5.2 | 5.2 |
| MgO | 10 | 10 | 10 | 10 | 10 |
| FeO | | | | | |
| ZnO | | | | | |
| $Li_2O$ | | | | | |
| $K_2O$ | | | | | |
| $Na_2O$ | 5 | 5 | 5 | 5 | 5 |
| CaO | | | | | |
| SrO | | | | | |
| BaO | | | | | |
| $P_2O_5$ | | | | 1.25 | 1.25 |
| $B_2O_3$ | 4 | 4 | 4 | 4 | 4 |
| $ZrO_2$ | | | | | |
| $CeO_2$ | 0 | 0.2 | 0.4 | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.46 | 0.46 | 0.45 | 0.47 | 0.44 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 730 | 750 | 750 | 750 | 770 |
| Retention time (minute) | 300 | 300 | 240 | 240 | 300 |
| Specific gravity after crystallization | 2.502 | 2.504 | 2.505 | 2.502 | 2.491 |
| Young's modulus E (GPa) | 88 | 89 | 90 | 87 | 88 |
| Vickers hardness (Hv) | 670 | 680 | 680 | 660 | 700 |
| Average crystal grain size (nm) | 7 | 5 | 5 | 5 | 6 |
| Maximum crystal grain size (nm) | 11 | 8 | 8 | 10 | 9 |
| Ra (Å) | 0.7 | 1.5 | 1.1 | 1.8 | 1.1 |

TABLE 7

|  | Example No. (% by mass) | | | | |
| --- | --- | --- | --- | --- | --- |
|  | 31 | 32 | 33 | 34 | 35 |
| $SiO_2$ | 58.3 | 57.8 | 57.3 | 58.3 | 58 |
| $Al_2O_3$ | 17.5 | 18 | 18.5 | 17 | 17 |
| $TiO_2$ | 5.2 | 5.2 | 5.2 | 5.2 | 5 |

TABLE 7-continued

|  | Example No. (% by mass) | | | | |
| --- | --- | --- | --- | --- | --- |
|  | 31 | 32 | 33 | 34 | 35 |
| MgO | 10 | 10 | 10 | 10.5 | 10 |
| FeO | | | | | |
| ZnO | | | | | |
| $Li_2O$ | | | | | |
| $K_2O$ | | | | | 2 |
| $Na_2O$ | 5 | 5 | 5 | 5 | 4 |
| CaO | | | | | |
| SrO | | | | | |
| BaO | | | | | |
| $P_2O_5$ | | | | | |
| $B_2O_3$ | 4 | 4 | 4 | 4 | 4 |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.47 | 0.48 | 0.50 | 0.47 | 0.47 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 770 | 750 | 730 | 730 |
| Retention time (minute) | 360 | 300 | 300 | 360 | 300 |
| Specific gravity after crystallization | 2.506 | 2.509 | 2.511 | 2.510 | 2.506 |
| Young's modulus E (GPa) | 90 | 90 | 91 | 89 | 88 |
| Vickers hardness (Hv) | 700 | 680 | 700 | 680 | 680 |
| Average crystal grain size (nm) | 5 | 8 | 5 | 5 | 4 |
| Maximum crystal grain size (nm) | 8 | 14 | 9 | 9 | 7 |
| Ra (Å) | 1.3 | 1.8 | 1.0 | 1.5 | 1.1 |

TABLE 8

|  | Example No. (% by mass) | | | | |
| --- | --- | --- | --- | --- | --- |
|  | 36 | 37 | 38 | 39 | 40 |
| $SiO_2$ | 58 | 57.3 | 56.3 | 58.3 | 55.8 |
| $Al_2O_3$ | 17 | 17.5 | 17.5 | 17.5 | 18.5 |
| $TiO_2$ | 5 | 5.2 | 5.2 | 5 | 5.2 |
| MgO | 10 | 10 | 10 | 10 | 10 |
| FeO | | | | | |
| ZnO | | | | | |
| $Li_2O$ | | | | | |
| $K_2O$ | 1 | | | | |
| $Na_2O$ | 5 | 5 | 5 | 5 | 5 |
| CaO | | | | | |
| SrO | | | | | |
| BaO | | | | | |
| $P_2O_5$ | | | | | |
| $B_2O_3$ | 4 | 5 | 6 | 4 | 5.5 |
| $ZrO_2$ | | | | 0.2 | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.47 | 0.48 | 0.49 | 0.47 | 0.51 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 770 | 750 | 750 |
| Retention time (minute) | 300 | 240 | 300 | 360 | 300 |
| Specific gravity after crystallization | 2.503 | 2.500 | 2.493 | 2.506 | 2.502 |

TABLE 8-continued

|  | Example No. (% by mass) | | | | |
| --- | --- | --- | --- | --- | --- |
|  | 36 | 37 | 38 | 39 | 40 |
| Young's modulus E (GPa) | 88 | 89 | 88 | 90 | 89 |
| Vickers hardness (Hv) | 690 | 690 | 670 | 680 | 680 |
| Average crystal grain size (nm) | 5 | 5 | 7 | 5 | 8 |
| Maximum crystal grain size (nm) | 8 | 8 | 10 | 8 | 12 |
| Ra (Å) | 0.7 | 0.9 | 1.3 | 1.5 | 1.9 |

TABLE 9

|  | Example No. (% by mass) | | | | |
| --- | --- | --- | --- | --- | --- |
|  | 41 | 42 | 43 | 44 | 45 |
| $SiO_2$ | 54.8 | 54.8 | 54.8 | 53.8 | 54.79 |
| $Al_2O_3$ | 18.5 | 18.5 | 18.5 | 19.5 | 18.5 |
| $TiO_2$ | 5.2 | 5.2 | 5 | 5 | 5 |
| MgO | 10 | 10 | 10 | 10 | 10 |
| FeO |  |  |  |  |  |
| ZnO |  |  |  |  |  |
| $Li_2O$ |  |  |  |  |  |
| $K_2O$ | 2 | 2 | 2 | 2 | 2 |
| $Na_2O$ | 4 | 4 | 4 | 4 | 4 |
| CaO |  |  |  |  |  |
| SrO |  |  |  |  |  |
| BaO |  |  |  |  |  |
| $P_2O_5$ |  | 5.5 |  |  |  |
| $B_2O_3$ | 5.5 | 0 | 5.5 | 5.5 | 5.5 |
| $ZrO_2$ |  |  | 0.2 | 0.2 | 0.2 |
| $CeO_2$ |  |  |  |  |  |
| $Sb_2O_3$ |  |  |  |  |  |
| $Y_2O_3$ |  |  |  |  |  |
| CuO |  |  |  |  | 0.01 |
| Total | 100 | 100 | 100 | 100 | 100 |
| $(Al_2O_3 + MgO)/SiO_2$ | 0.52 | 0.52 | 0.52 | 0.55 | 0.52 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 730 |
| Retention time (minute) | 300 | 360 | 300 | 300 | 300 |
| Specific gravity after crystallization | 2.506 | 2.520 | 2.509 | 2.518 | 2.504 |
| Young's modulus E (GPa) | 89 | 89 | 88 | 89 | 88 |
| Vickers hardness (Hv) | 690 | 690 | 680 | 670 | 660 |
| Average crystal grain size (nm) | 8 | 5 | 4 | 5 | 4 |
| Maximum crystal grain size (nm) | 15 | 9 | 8 | 9 | 9 |
| Ra (Å) | 1.4 | 1.5 | 1.1 | 1.3 | 0.8 |

TABLE 10

|  | Example No. (% by mass) | | | | |
| --- | --- | --- | --- | --- | --- |
|  | 46 | 47 | 48 | 49 | 50 |
| $SiO_2$ | 54.78 | 54.3 | 54.3 | 54.8 | 54.8 |
| $Al_2O_3$ | 18.5 | 20.5 | 20.5 | 18.5 | 18.5 |
| $TiO_2$ | 5 | 5.2 | 4.7 | 5 | 5 |
| MgO | 10 | 8 | 8.5 | 11 | 10 |
| FeO |  |  |  |  |  |
| ZnO |  |  |  |  |  |
| $Li_2O$ |  |  |  |  |  |

TABLE 10-continued

|  | Example No. (% by mass) | | | | |
|---|---|---|---|---|---|
|  | 46 | 47 | 48 | 49 | 50 |
| K$_2$O | 2 |  |  | 1 | 1 |
| Na$_2$O | 4 | 4 | 4 | 4 | 4 |
| CaO |  |  |  |  | 1 |
| SrO |  |  |  |  |  |
| BaO |  |  |  |  |  |
| P$_2$O$_5$ |  |  |  |  |  |
| B$_2$O$_3$ | 5.5 | 8 | 8 | 5.5 | 5.5 |
| ZrO$_2$ | 0.2 |  |  | 0.2 | 0.2 |
| CeO$_2$ |  |  |  |  |  |
| Sb$_2$O$_3$ |  |  |  |  |  |
| Y$_2$O$_3$ |  |  |  |  |  |
| CuO |  | 0.02 |  |  |  |
| Total | 100 | 100 | 100 | 100 | 100 |
| (Al$_2$O$_3$ + MgO)/SiO$_2$ | 0.52 | 0.52 | 0.53 | 0.54 | 0.52 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 770 | 750 | 750 | 750 | 750 |
| Retention time (minute) | 300 | 240 | 180 | 300 | 360 |
| Specific gravity after crystallization | 2.505 | 2.479 | 2.476 | 2.522 | 2.519 |
| Young's modulus E (GPa) | 88 | 87 | 88 | 91 | 90 |
| Vickers hardness (Hv) | 680 | 680 | 680 | 690 | 690 |
| Average crystal grain size (nm) | 5 | 5 | 6 | 5 | 4 |
| Maximum crystal grain size (nm) | 10 | 9 | 10 | 10 | 9 |
| Ra (Å) | 1.1 | 1.5 | 1.1 | 1.8 | 1.1 |

TABLE 11

|  | Example No. (% by mass) | | | | |
|---|---|---|---|---|---|
|  | 51 | 52 | 53 | 54 | 55 |
| SiO$_2$ | 54.8 | 54.75 | 54.78 | 54.76 | 54.78 |
| Al$_2$O$_3$ | 18.5 | 18.49 | 18.49 | 18.49 | 18.49 |
| TiO$_2$ | 4.7 | 5 | 5 | 5 | 5.2 |
| MgO | 10 | 9.99 | 10 | 10 | 10 |
| FeO |  |  |  |  |  |
| ZnO |  |  |  |  |  |
| Li$_2$O |  |  |  |  |  |
| K$_2$O | 2 | 2 | 2 | 2 | 2 |
| Na$_2$O | 4 | 4 | 4 | 4 | 4 |
| CaO |  |  |  |  |  |
| SrO |  |  |  |  |  |
| BaO |  |  |  |  |  |
| P$_2$O$_5$ |  |  |  |  |  |
| B$_2$O$_3$ | 5.5 | 5.5 | 5.5 | 5.5 | 5.5 |
| ZrO$_2$ | 0.5 | 0.2 | 0.2 | 0.2 |  |
| CeO$_2$ |  |  |  |  |  |
| Sb$_2$O$_3$ |  |  |  |  |  |
| Y$_2$O$_3$ |  |  |  |  |  |
| CuO |  | 0.07 | 0.03 | 0.05 | 0.03 |
| Total | 100 | 100 | 100 | 100 | 100 |
| (Al$_2$O$_3$ + MgO)/SiO$_2$ | 0.52 | 0.52 | 0.52 | 0.52 | 0.52 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 730 | 730 | 750 |
| Retention time (minute) | 300 | 300 | 360 | 240 | 300 |
| Specific gravity after crystallization | 2.507 | 2.505 | 2.502 | 2.505 | 2.505 |
| Young's modulus E (GPa) | 90 | 88 | 88 | 88 | 89 |
| Vickers hardness (Hv) | 690 | 680 | 670 | 670 | 690 |

TABLE 11-continued

|  | Example No. (% by mass) | | | | |
| --- | --- | --- | --- | --- | --- |
|  | 51 | 52 | 53 | 54 | 55 |
| Average crystal grain size (nm) | 5 | 5 | 4 | 4 | 5 |
| Maximum crystal grain size (nm) | 9 | 8 | 8 | 7 | 9 |
| Ra (Å) | 1.3 | 1.4 | 1.5 | 1.5 | 1.2 |

TABLE 12

|  | Example No. (% by mass) | | | | |
| --- | --- | --- | --- | --- | --- |
|  | 56 | 57 | Comparative Example 1 | Comparative Example 2 | Comparative Example 3 |
| $SiO_2$ | 53.35 | 53.85 | 66.3 | 48 | 52.1 |
| $Al_2O_3$ | 17.5 | 16.5 | 10.5 | 18.5 | 14.5 |
| $TiO_2$ | 5.5 | 5.5 | 3 | 1.5 | 5.5 |
| MgO | 6.4 | 5 | 5 | 13 | 10 |
| FeO | 5 | 7 |  |  |  |
| ZnO |  | 1.5 |  |  | 5.5 |
| $Li_2O$ |  |  |  |  |  |
| $K_2O$ | 1 |  |  |  |  |
| $Na_2O$ | 5 | 4.5 | 7 | 9 | 4.8 |
| CaO | 1 |  |  |  | 1.5 |
| SrO |  |  |  |  | 1.1 |
| BaO |  |  |  |  | 1.3 |
| $P_2O_5$ | 5.25 | 1.15 |  |  | 1.5 |
| $B_2O_3$ |  | 5 | 8.2 | 10 | 1 |
| $ZrO_2$ |  |  |  |  |  |
| $CeO_2$ |  |  |  |  |  |
| $Sb_2O_3$ |  |  |  |  |  |
| $Y_2O_3$ |  |  |  |  | 1.2 |
| CuO |  |  |  |  |  |
| Total | 100 | 100 | 100 | 100 | 100 |
| $(Al_2O_3 + MgO)/SiO_2$ | 0.54 | 0.40 | 0.23 | 0.66 |  |
| Main crystal phase | $FeAl_2O_4$ | $FeAl_2O_4$ | — | — | $MgAl_2O_4$ |
| Crystallization temperature (° C.) | 750 | 750 | 750 | 770 | 750 |
| Retention time (minute) | 300 | 300 | 360 | 300 | 300 |
| Specific gravity after crystallization | 2.634 | 2.695 | (2.466) | (2.563) | 2.723 |
| Young's modulus E (GPa) | 90 | 89 | 79 | 81 | 92 |
| Vickers hardness (Hv) | 690 | 670 |  |  | 650 |
| Average crystal grain size (nm) | 9 | 5 | — | — | 9 |
| Maximum crystal grain size (nm) | 13 | 9 | — | — | 15 |
| Ra (Å) | 1.8 | 1.0 | 2.3 | 5.2 | 1.9 |

TABLE 13

|  | Example No. (% by mass) | | | | |
| --- | --- | --- | --- | --- | --- |
|  | 58 | 59 | 60 | 61 | 62 |
| $SiO_2$ | 55.3 | 52.8 | 54.8 | 56.3 | 54.8 |
| $Al_2O_3$ | 15.0 | 22.0 | 18.8 | 15.0 | 18.5 |
| $TiO_2$ | 5.2 | 5.2 | 5.2 | 5.2 | 3.5 |
| MgO | 13.0 | 8.5 | 7.7 | 10.0 | 10.0 |
| FeO |  |  |  |  |  |
| ZnO |  |  |  |  |  |
| $Li_2O$ |  |  |  |  |  |
| $K_2O$ | 2.0 | 2.0 | 2.0 | 2.0 | 2.0 |
| $Na_2O$ | 4.0 | 4.0 | 4.0 | 4.0 | 8.7 |

TABLE 13-continued

|  | Example No. (% by mass) | | | | |
| --- | --- | --- | --- | --- | --- |
|  | 58 | 59 | 60 | 61 | 62 |
| CaO |  |  | 2.0 | 1.5 |  |
| SrO |  |  |  |  |  |
| BaO |  |  |  |  |  |
| P$_2$O$_5$ |  |  |  |  |  |
| B$_2$O$_3$ | 5.5 | 5.5 | 5.5 | 6.0 | 2.5 |
| ZrO$_2$ |  |  |  |  |  |
| CeO$_2$ |  |  |  |  |  |
| Sb$_2$O$_3$ |  |  |  |  |  |
| Y$_2$O$_3$ |  |  |  |  |  |
| CuO |  |  |  |  |  |
| Total | 100 | 100 | 100 | 100 | 100 |
| (Al$_2$O$_3$ + MgO)/SiO$_2$ | 0.51 | 0.58 | 0.48 | 0.44 | 0.52 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 750 | 750 | 750 |
| Retention time (minute) | 300 | 300 | 360 | 300 | 240 |
| Specific gravity after crystallization | 2.551 | 2.546 | 2.517 | 2.507 | 2.522 |
| Young's modulus E (GPa) | 91 | 93 | 88 | 87 | 83 |
| Vickers hardness (Hv) | 690 | 680 | 670 | 670 | 690 |
| Average crystal grain size (nm) | 4 | 4 | 8 | 5 | 6 |
| Maximum crystal grain size (nm) | 8 | 7 | 10 | 9 | 10 |
| Ra (Å) | 1.6 | 1.5 | 1.8 | 1.7 | 1.8 |

TABLE 14

|  | Example No. (% by mass) | | | | |
| --- | --- | --- | --- | --- | --- |
|  | 63 | 64 | 65 | 66 | 67 |
| SiO$_2$ | 54.8 | 54.8 | 54.8 | 54.8 | 54.8 |
| Al$_2$O$_3$ | 18.5 | 18.5 | 18.5 | 18.5 | 18.5 |
| TiO$_2$ | 5.2 | 4.7 | 4.2 | 4.2 | 3.2 |
| MgO | 10.0 | 10.0 | 10.0 | 9.3 | 10.00 |
| FeO |  |  |  |  |  |
| ZnO |  |  |  |  |  |
| Li$_2$O |  |  |  |  |  |
| K$_2$O | 2.0 | 1.5 | 1.5 | 1.5 | 1.5 |
| Na$_2$O | 9.5 | 5.0 | 5.5 | 5.5 | 7.5 |
| CaO |  |  |  | 0.7 |  |
| SrO |  |  |  |  |  |
| BaO |  |  |  |  |  |
| P$_2$O$_5$ |  |  |  |  |  |
| B$_2$O$_3$ |  | 5.5 | 5.5 | 5.5 | 4.5 |
| ZrO$_2$ |  |  |  |  |  |
| CeO$_2$ |  |  |  |  |  |
| Sb$_2$O$_3$ |  |  |  |  |  |
| Y$_2$O$_3$ |  |  |  |  |  |
| CuO |  |  |  |  |  |
| Total | 100 | 100 | 100 | 100 | 100 |
| (Al$_2$O$_3$ + MgO)/SiO$_2$ | 0.52 | 0.52 | 0.52 | 0.51 | 0.52 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 750 | 750 | 750 |
| Retention time (minute) | 300 | 300 | 300 | 300 | 300 |
| Specific gravity after crystallization | 2.562 | 2.502 | 2.503 | 2.501 | 2.500 |
| Young's modulus E (GPa) | 86 | 86 | 87 | 85 | 83 |
| Vickers hardness (Hv) | 670 | 670 | 680 | 670 | 670 |
| Average crystal grain size (nm) | 8 | 8 | 6 | 4 | 5 |

TABLE 14-continued

|  | Example No. (% by mass) | | | | |
| --- | --- | --- | --- | --- | --- |
|  | 63 | 64 | 65 | 66 | 67 |
| Maximum crystal grain size (nm) | 10 | 11 | 9 | 10 | 11 |
| Ra (Å) | 1.9 | 1.8 | 1.5 | 1.7 | 1.9 |

TABLE 15

|  | Example No. (% by mass) | | | | |
| --- | --- | --- | --- | --- | --- |
|  | 68 | 69 | 70 | 71 | 72 |
| $SiO_2$ | 54.8 | 54.8 | 54.8 | 54.8 | 58.0 |
| $Al_2O_3$ | 18.5 | 18.5 | 18.5 | 18.5 | 15.0 |
| $TiO_2$ | 5.0 | 4.8 | 4.5 | 4.5 | 5.0 |
| MgO | 10.0 | 10.0 | 10.0 | 9.5 | 10.0 |
| FeO |  |  |  |  |  |
| ZnO |  |  |  |  |  |
| $Li_2O$ |  |  |  |  |  |
| $K_2O$ | 2.0 | 1.9 | 1.7 | 1.7 | 2.0 |
| $Na_2O$ | 4.2 | 4.5 | 5.0 | 5.0 | 7.0 |
| CaO |  |  |  | 0.5 |  |
| SrO |  |  |  |  |  |
| BaO |  |  |  |  |  |
| $P_2O_5$ |  |  |  |  |  |
| $B_2O_3$ | 5.5 | 5.5 | 5.5 | 5.5 | 3.0 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.52 | 0.52 | 0.52 | 0.51 | 0.43 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 750 |
| Retention time (minute) | 360 | 280 | 300 | 300 | 300 |
| Specific gravity after crystallization | 2.504 | 2.506 | 2.504 | 2.504 | 2.565 |
| Young's modulus E (GPa) | 86 | 88 | 86 | 85 | 91 |
| Vickers hardness (Hv) | 680 | 670 | 680 | 680 | 690 |
| Average crystal grain size (nm) | 4 | 4 | 5 | 5 | 4 |
| Maximum crystal grain size (nm) | 10 | 10 | 10 | 9 | 9 |
| Ra (Å) | 1.8 | 1.9 | 1.6 | 1.7 | 1.6 |

TABLE 16

|  | Example No. (% by mass) | | | | |
| --- | --- | --- | --- | --- | --- |
|  | 73 | 74 | 75 | 76 | 77 |
| $SiO_2$ | 58.0 | 61.0 | 61.0 | 56.0 | 54.5 |
| $Al_2O_3$ | 15.0 | 12.0 | 12.0 | 20.0 | 22.5 |
| $TiO_2$ | 5.0 | 4.5 | 4.5 | 5.0 | 5.0 |
| MgO | 10.0 | 10.0 | 10.0 | 10.0 | 10.0 |
| FeO |  |  |  |  |  |
| ZnO |  |  |  |  |  |
| $Li_2O$ |  |  | 0.5 |  |  |
| $K_2O$ | 3.0 | 2.0 | 2.0 | 1.5 | 1.0 |
| $Na_2O$ | 8.0 | 7.0 | 7.0 | 4.5 | 4.0 |
| CaO |  |  |  |  |  |
| SrO |  |  |  |  |  |
| BaO |  |  |  |  |  |
| $P_2O_5$ |  |  |  |  |  |

TABLE 16-continued

|  | Example No. (% by mass) | | | | |
| --- | --- | --- | --- | --- | --- |
|  | 73 | 74 | 75 | 76 | 77 |
| B$_2$O$_3$ | 1.0 | 3.5 | 3.0 | 3.0 | 3.0 |
| ZrO$_2$ | | | | | |
| CeO$_2$ | | | | | |
| Sb$_2$O$_3$ | | | | | |
| Y$_2$O$_3$ | | | | | |
| CuO | | | | | |
| Total | 100 | 100 | 100 | 100 | 100 |
| (Al$_2$O$_3$ + MgO)/SiO$_2$ | 0.43 | 0.36 | 0.36 | 0.54 | 0.60 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 750 | 750 | 750 |
| Retention time (minute) | 360 | 420 | 300 | 380 | 300 |
| Specific gravity after crystallization | 2.576 | 2.522 | 2.579 | 2.523 | 2.545 |
| Young's modulus E (GPa) | 88 | 89 | 88 | 87 | 91 |
| Vickers hardness (Hv) | 680 | 690 | 660 | 670 | 670 |
| Average crystal grain size (nm) | 4 | 5 | 4 | 6 | 4 |
| Maximum crystal grain size (nm) | 9 | 10 | 9 | 11 | 9 |
| Ra (Å) | 1.7 | 1.8 | 1.6 | 1.8 | 1.6 |

TABLE 17

|  | Example No. (% by mass) | | | | |
| --- | --- | --- | --- | --- | --- |
|  | 78 | 79 | 80 | 81 | 82 |
| SiO$_2$ | 57.6 | 54.3 | 57.5 | 57.5 | 57.6 |
| Al$_2$O$_3$ | 17.5 | 22.5 | 17.5 | 17.5 | 17.5 |
| TiO$_2$ | 5.0 | 4.5 | 5.0 | 5.0 | 5.0 |
| MgO | 10.0 | 10.0 | 8.5 | 8.5 | 8.5 |
| FeO | | | | | |
| ZnO | | | | | |
| Li$_2$O | | | | | |
| K$_2$O | 1.5 | 1.5 | 1.5 | | 1.5 |
| Na$_2$O | 5.4 | 4.2 | 6.0 | 7.5 | 6.9 |
| CaO | | | | | |
| SrO | | | | | |
| BaO | | | | | |
| P$_2$O$_5$ | | | 1.0 | 1.0 | |
| B$_2$O$_3$ | 3.0 | 3.0 | 3.0 | 3.0 | 3.0 |
| ZrO$_2$ | | | | | |
| CeO$_2$ | | | | | |
| Sb$_2$O$_3$ | | | | | |
| Y$_2$O$_3$ | | | | | |
| CuO | | | | | |
| Total | 100 | 100 | 100 | 100 | 100 |
| (Al$_2$O$_3$ + MgO)/SiO$_2$ | 0.48 | 0.60 | 0.45 | 0.45 | 0.45 |
| Main crystal phase | MgAl$_2$O$_4$ | MgAl$_2$O$_4$ | MgAl$_2$O$_4$ | MgAl$_2$O$_4$ | MgAl$_2$O$_4$ |
| Crystallization temperature (° C.) | 750 | 750 | 750 | 750 | 750 |
| Retention time (minute) | 300 | 300 | 380 | 290 | 480 |
| Specific gravity after crystallization | 2.512 | 2.535 | 2.488 | 2.501 | 2.496 |
| Young's modulus E (GPa) | 88 | 92 | 89 | 88 | 90 |
| Vickers hardness (Hv) | 660 | 690 | 650 | 660 | 670 |
| Average crystal grain size (nm) | 4 | 5 | 4 | 4 | 4 |
| Maximum crystal grain size (nm) | 8 | 9 | 10 | 8 | 9 |
| Ra (Å) | 1.6 | 1.8 | 1.5 | 1.7 | 1.6 |

TABLE 18

|  | Example No. (% by mass) | | | | |
| --- | --- | --- | --- | --- | --- |
|  | 83 | 84 | 85 | 86 | 87 |
| $SiO_2$ | 58.5 | 56.5 | 57.5 | 58.0 | 59.0 |
| $Al_2O_3$ | 15.0 | 17.5 | 17.5 | 17.5 | 17.5 |
| $TiO_2$ | 5.0 | 5.0 | 5.0 | 5.0 | 5.0 |
| MgO | 8.5 | 9.5 | 8.5 | 7.5 | 6.7 |
| FeO |  |  |  |  |  |
| ZnO |  |  |  | 1.0 | 1.8 |
| $Li_2O$ |  |  |  |  |  |
| $K_2O$ | 1.5 | 2.7 |  | 1.5 | 1.5 |
| $Na_2O$ | 7.5 | 5.0 | 7.7 | 5.5 | 4.5 |
| CaO |  |  |  |  |  |
| SrO |  |  |  |  |  |
| BaO |  |  |  |  |  |
| $P_2O_5$ | 1.0 |  |  | 1.0 | 1.0 |
| $B_2O_3$ | 3.0 | 3.8 | 3.8 | 3.0 | 3.0 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.40 | 0.48 | 0.45 | 0.43 | 0.41 |
| Main crystal phase | $MgAl_2O_4$ | $MgAl_2O_4$ | $MgAl_2O_4$ | $ZnAl_2O_4$ $MgAl_2O_4$ | $ZnAl_2O_4$ $MgAl_2O_4$ |
| Crystallization temperature (° C.) | 750 | 750 | 750 | 750 | 750 |
| Retention time (minute) | 300 | 350 | 300 | 300 | 300 |
| Specific gravity after crystallization | 2.522 | 2.517 | 2.509 | 2.488 | 2.506 |
| Young's modulus E (GPa) | 87 | 87 | 88 | 85 | 89 |
| Vickers hardness (Hv) | 690 | 690 | 680 | 690 | 670 |
| Average crystal grain size (nm) | 4 | 5 | 3 | 4 | 4 |
| Maximum crystal grain size (nm) | 10 | 10 | 9 | 10 | 10 |
| Ra (Å) | 1.8 | 1.9 | 1.7 | 1.6 | 1.5 |

TABLE 19

|  | Example No. (% by mass) | | | | |
| --- | --- | --- | --- | --- | --- |
|  | 88 | 89 | 90 | 91 | 92 |
| $SiO_2$ | 57.5 | 57.0 | 55.0 | 55.0 | 56.0 |
| $Al_2O_3$ | 17.5 | 17.5 | 17.5 | 17.5 | 17.5 |
| $TiO_2$ | 5.0 | 5.0 | 5.0 | 5.0 | 5.0 |
| MgO | 7.5 | 6.5 | 8.5 | 8.5 | 8.5 |
| FeO |  |  |  |  |  |
| ZnO |  |  |  |  |  |
| $Li_2O$ |  |  |  |  |  |
| $K_2O$ | 1.5 | 1.5 | 1.5 | 5.5 | 1.5 |
| $Na_2O$ | 6.0 | 8.5 | 8.0 | 4.0 | 8.0 |
| CaO | 1.0 |  |  |  |  |
| SrO |  |  |  |  |  |
| BaO |  |  |  |  |  |
| $P_2O_5$ | 1.0 | 1.0 | 1.0 | 1.0 |  |
| $B_2O_3$ | 3.0 | 3.0 | 3.5 | 3.5 | 3.5 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.43 | 0.42 | 0.47 | 0.47 | 0.46 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 750 |

TABLE 19-continued

|  | Example No. (% by mass) | | | | |
| --- | --- | --- | --- | --- | --- |
|  | 88 | 89 | 90 | 91 | 92 |
| Retention time (minute) | 380 | 300 | 290 | 290 | 310 |
| Specific gravity after crystallization | 2.497 | 2.500 | 2.533 | 2.501 | 2.543 |
| Young's modulus E (GPa) | 88 | 87 | 90 | 86 | 88 |
| Vickers hardness (Hv) | 660 | 690 | 670 | 680 | 650 |
| Average crystal grain size (nm) | 4 | 4 | 3 | 3 | 4 |
| Maximum crystal grain size (nm) | 9 | 8 | 7 | 8 | 9 |
| Ra (Å) | 1.7 | 1.5 | 1.6 | 1.7 | 1.9 |

TABLE 20

|  | Example No. (% by mass) | | | | |
| --- | --- | --- | --- | --- | --- |
|  | 93 | 94 | 95 | 96 | 97 |
| $SiO_2$ | 57.0 | 56.2 | 57.4 | 56.0 | 55.0 |
| $Al_2O_3$ | 17.5 | 17.5 | 17.5 | 17.5 | 17.5 |
| $TiO_2$ | 5.5 | 5.5 | 5.5 | 5.0 | 5.0 |
| MgO | 8.5 | 8.5 | 8.5 | 8.8 | 8.8 |
| FeO | | | | | |
| ZnO | | | | | |
| $Li_2O$ | | | | | |
| $K_2O$ | 1.5 | 1.5 | 1.5 | 2.2 | 4.9 |
| $Na_2O$ | 6.2 | 6.0 | 5.8 | 5.7 | 4.0 |
| CaO | | | | | |
| SrO | | | | | |
| BaO | | | | | |
| $P_2O_5$ | | 1.0 | | 1.0 | 1.0 |
| $B_2O_3$ | 3.8 | 3.8 | 3.8 | 3.8 | 3.8 |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.46 | 0.46 | 0.45 | 0.47 | 0.48 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 750 |
| Retention time (minute) | 380 | 340 | 330 | 300 | 310 |
| Specific gravity after crystallization | 2.513 | 2.501 | 2.498 | 2.500 | 2.503 |
| Young's modulus E (GPa) | 89 | 88 | 87 | 85 | 88 |
| Vickers hardness (Hv) | 690 | 680 | 680 | 680 | 680 |
| Average crystal grain size (nm) | 4 | 4 | 5 | 3 | 3 |
| Maximum crystal grain size (nm) | 8 | 9 | 8 | 7 | 7 |
| Ra (Å) | 1.8 | 1.7 | 1.6 | 1.7 | 1.6 |

TABLE 21

|  | Example No. (% by mass) | | | | |
| --- | --- | --- | --- | --- | --- |
|  | 98 | 99 | 100 | 101 | 102 |
| $SiO_2$ | 55.0 | 55.0 | 54.0 | 58.3 | 55.7 |
| $Al_2O_3$ | 17.5 | 18.0 | 17.5 | 16.0 | 17.5 |
| $TiO_2$ | 5.5 | 5.5 | 5.5 | 5.0 | 5.0 |

TABLE 21-continued

| | Example No. (% by mass) | | | | |
|---|---|---|---|---|---|
| | 98 | 99 | 100 | 101 | 102 |
| MgO | 8.5 | 8.5 | 8.5 | 8.0 | 8.0 |
| FeO | | | | | |
| ZnO | | | | 0.5 | 0.5 |
| $Li_2O$ | | | | | |
| $K_2O$ | 2.2 | 2.2 | 5.5 | 3.7 | 3.3 |
| $Na_2O$ | 6.8 | 5.8 | 4.5 | 5.0 | 5.0 |
| CaO | | 0.5 | | | |
| SrO | | | | | |
| BaO | | | | | |
| $P_2O_5$ | 1.0 | 1.0 | 1.0 | | 1.0 |
| $B_2O_3$ | 3.5 | 3.5 | 3.5 | 3.0 | 3.5 |
| $ZrO_2$ | | | | 0.5 | 0.5 |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.47 | 0.48 | 0.48 | 0.41 | 0.46 |
| Main crystal phase | $MgAl_2O_4$ | $MgAl_2O_4$ | $MgAl_2O_4$ | $ZnAl_2O_4$ $MgAl_2O_4$ | $ZnAl_2O_4$ $MgAl_2O_4$ |
| Crystallization temperature (° C.) | 750 | 750 | 750 | 750 | 750 |
| Retention time (minute) | 380 | 330 | 330 | 300 | 320 |
| Specific gravity after crystallization | 2.509 | 2.503 | 2.512 | 2.500 | 2.507 |
| Young's modulus E (GPa) | 89 | 87 | 90 | 87 | 88 |
| Vickers hardness (Hv) | 680 | 650 | 660 | 690 | 690 |
| Average crystal grain size (nm) | 4 | 3 | 3 | 2 | 3 |
| Maximum crystal grain size (nm) | 9 | 9 | 8 | 7 | 8 |
| Ra (Å) | 1.8 | 1.9 | 1.7 | 1.8 | 1.8 |

TABLE 22

| | Example No. (% by mass) | | | | |
|---|---|---|---|---|---|
| | 103 | 104 | 105 | 106 | 107 |
| $SiO_2$ | 55.7 | 54.5 | 55.8 | 55.8 | 55.6 |
| $Al_2O_3$ | 17.5 | 17.5 | 17.5 | 17.5 | 17.5 |
| $TiO_2$ | 5.0 | 5.0 | 5.0 | 5.0 | 5.0 |
| MgO | 8.0 | 8.0 | 8.0 | 8.7 | 8.0 |
| FeO | | | | | |
| ZnO | 0.5 | | 0.5 | | |
| $Li_2O$ | | | | | |
| $K_2O$ | 3.3 | 4.5 | 2.5 | 2.2 | 2.5 |
| $Na_2O$ | 5.0 | 5.3 | 5.7 | 5.7 | 5.7 |
| CaO | 0.5 | 0.7 | 0.5 | 0.6 | 1.2 |
| SrO | | | | | |
| BaO | | | | | |
| $P_2O_5$ | 1.0 | 1.0 | 1.0 | 1.0 | 1.0 |
| $B_2O_3$ | 3.5 | 3.5 | 3.5 | 3.5 | 3.5 |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.46 | 0.47 | 0.46 | 0.47 | 0.46 |
| Main crystal phase | $ZnAl_2O_4$ $MgAl_2O_4$ | $MgAl_2O_4$ | $ZnAl_2O_4$ $MgAl_2O_4$ | $MgAl_2O_4$ | $MgAl_2O_4$ |
| Crystallization temperature (° C.) | 750 | 750 | 750 | 750 | 750 |
| Retention time (minute) | 300 | 310 | 300 | 310 | 320 |

TABLE 22-continued

|  | Example No. (% by mass) | | | | |
| --- | --- | --- | --- | --- | --- |
|  | 103 | 104 | 105 | 106 | 107 |
| Specific gravity after crystallization | 2.512 | 2.518 | 2.521 | 2.511 | 2.506 |
| Young's modulus E (GPa) | 90 | 89 | 88 | 87 | 86 |
| Vickers hardness (Hv) | 660 | 690 | 670 | 660 | 680 |
| Average crystal grain size (nm) | 3 | 3 | 3 | 3 | 4 |
| Maximum crystal grain size (nm) | 9 | 8 | 8 | 9 | 8 |
| Ra (Å) | 1.6 | 1.8 | 1.6 | 1.6 | 1.7 |

TABLE 23

|  | Example No. (% by mass) | | | | |
| --- | --- | --- | --- | --- | --- |
|  | 108 | 109 | 110 | 111 | 112 |
| $SiO_2$ | 58.3 | 58.7 | 58.1 | 56.8 | 56.8 |
| $Al_2O_3$ | 17.5 | 17.5 | 17.5 | 17.5 | 17.5 |
| $TiO_2$ | 5.2 | 5.0 | 5.0 | 5.0 | 5.0 |
| MgO | 9.2 | 4.8 | 2.6 | 10.0 | 10.0 |
| FeO |  |  |  |  |  |
| ZnO |  |  | 1.5 |  |  |
| $Li_2O$ |  |  |  |  |  |
| $K_2O$ |  |  |  |  | 1.7 |
| $Na_2O$ | 5.0 | 5.0 | 4.0 | 6.7 | 5.0 |
| CaO | 0.8 | 5.0 | 3.0 |  |  |
| SrO |  |  | 1.0 |  |  |
| BaO |  |  | 0.8 |  |  |
| $P_2O_5$ |  |  |  |  |  |
| $B_2O_3$ | 4.0 | 4.0 | 6.5 | 4.0 | 4.0 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.46 | 0.38 | 0.35 | 0.48 | 0.48 |
| Main crystal phase | $MgAl_2O_4$ | $MgAl_2O_4$ | $ZnAl_2O_4$ $MgAl_2O_4$ | $MgAl_2O_4$ | $MgAl_2O_4$ |
| Crystallization temperature (° C.) | 750 | 750 | 750 | 750 | 750 |
| Retention time (minute) | 300 | 300 | 350 | 300 | 310 |
| Specific gravity after crystallization | 2.506 | 2.503 | 2.524 | 2.521 | 2.516 |
| Young's modulus E (GPa) | 87 | 85 | 88 | 90 | 87 |
| Vickers hardness (Hv) | 680 | 680 | 690 | 680 | 660 |
| Average crystal grain size (nm) | 6 | 3 | 4 | 6 | 5 |
| Maximum crystal grain size (nm) | 11 | 7 | 7 | 10 | 9 |
| Ra (Å) | 1.9 | 1.5 | 1.6 | 1.8 | 1.7 |

TABLE 24

|  | Example No. (% by mass) | | | | |
| --- | --- | --- | --- | --- | --- |
|  | 113 | 114 | 115 | 116 | 117 |
| $SiO_2$ | 57.3 | 56.8 | 54.8 | 57.8 | 56.8 |
| $Al_2O_3$ | 17.5 | 17.5 | 18.5 | 17.5 | 17.5 |
| $TiO_2$ | 5.0 | 5.0 | 5.2 | 5.0 | 5.0 |
| MgO | 5.5 | 3.6 | 9.5 | 10.0 | 9.0 |

TABLE 24-continued

|  | Example No. (% by mass) | | | | |
|---|---|---|---|---|---|
|  | 113 | 114 | 115 | 116 | 117 |
| FeO |  |  |  |  |  |
| ZnO |  | 1.3 |  |  |  |
| $Li_2O$ |  |  | 0.5 |  |  |
| $K_2O$ |  |  | 2.0 |  |  |
| $Na_2O$ | 5.0 | 6.0 | 9.5 | 7.2 | 7.7 |
| CaO | 5.7 | 3.8 |  |  |  |
| SrO |  |  |  |  |  |
| BaO |  | 1.0 |  |  |  |
| $P_2O_5$ |  |  |  |  |  |
| $B_2O_3$ | 4.0 | 4.0 |  | 2.5 | 4.0 |
| $ZrO_2$ |  |  |  |  |  |
| $CeO_2$ |  |  |  |  |  |
| $Sb_2O_3$ |  |  |  |  |  |
| $Y_2O_3$ |  | 1.0 |  |  |  |
| CuO |  |  |  |  |  |
| Total | 100 | 100 | 100 | 100 | 100 |
| $(Al_2O_3 + MgO)/SiO_2$ | 0.40 | 0.37 | 0.51 | 0.48 | 0.47 |
| Main crystal phase | $MgAl_2O_4$ | $ZnAl_2O_4$ $MgAl_2O_4$ | $MgAl_2O_4$ | $MgAl_2O_4$ | $MgAl_2O_4$ |
| Crystallization temperature (° C.) | 750 | 750 | 750 | 750 | 750 |
| Retention time (minute) | 350 | 300 | 300 | 300 | 310 |
| Specific gravity after crystallization | 2.525 | 2.561 | 2.572 | 2.526 | 2.522 |
| Young's modulus E (GPa) | 86 | 88 | 91 | 89 | 89 |
| Vickers hardness (Hv) | 670 | 660 | 650 | 660 | 670 |
| Average crystal grain size (nm) | 4 | 4 | 3 | 3 | 3 |
| Maximum crystal grain size (nm) | 8 | 9 | 9 | 8 | 9 |
| Ra (Å) | 1.6 | 1.7 | 1.6 | 1.5 | 1.8 |

TABLE 25

|  | Example No. (% by mass) | | | | |
|---|---|---|---|---|---|
|  | 118 | 119 | 120 | 121 | 122 |
| $SiO_2$ | 57.3 | 56.7 | 56.7 | 56.8 | 57.7 |
| $Al_2O_3$ | 17.5 | 17.5 | 17.5 | 17.5 | 17.3 |
| $TiO_2$ | 5.2 | 5.0 | 5.0 | 5.0 | 5.1 |
| MgO | 10.0 | 9.5 | 5.3 | 7.7 | 7.4 |
| FeO |  |  |  |  |  |
| ZnO |  |  |  |  |  |
| $Li_2O$ |  |  |  |  |  |
| $K_2O$ |  |  |  |  |  |
| $Na_2O$ | 5.0 | 6.3 | 6.5 | 4.0 | 5.0 |
| CaO |  |  | 5.0 | 5.0 | 3.5 |
| SrO |  |  |  |  |  |
| BaO |  |  |  |  |  |
| $P_2O_5$ | 1.0 | 1.0 |  |  |  |
| $B_2O_3$ | 4.0 | 4.0 | 4.0 | 4.0 | 4.0 |
| $ZrO_2$ |  |  |  |  |  |
| $CeO_2$ |  |  |  |  |  |
| $Sb_2O_3$ |  |  |  |  |  |
| $Y_2O_3$ |  |  |  |  |  |
| CuO |  |  |  |  |  |
| Total | 100 | 100 | 100 | 100 | 100 |
| $(Al_2O_3 + MgO)/SiO_2$ | 0.48 | 0.48 | 0.39 | 0.44 | 0.43 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 750 |
| Retention time (minute) | 300 | 300 | 300 | 300 | 300 |
| Specific gravity after crystallization | 2.505 | 2.499 | 2.512 | 2.543 | 2.520 |

TABLE 25-continued

| | Example No. (% by mass) | | | | |
|---|---|---|---|---|---|
| | 118 | 119 | 120 | 121 | 122 |
| Young's modulus E (GPa) | 85 | 87 | 86 | 87 | 85 |
| Vickers hardness (Hv) | 660 | 690 | 680 | 660 | 670 |
| Average crystal grain size (nm) | 2 | 3 | 4 | 3 | 4 |
| Maximum crystal grain size (nm) | 9 | 7 | 9 | 8 | 9 |
| Ra (Å) | 1.9 | 1.6 | 1.7 | 1.4 | 1.5 |

TABLE 26

| | Example No. (% by mass) | | | | |
|---|---|---|---|---|---|
| | 123 | 124 | 125 | 126 | 127 |
| $SiO_2$ | 57.7 | 57.2 | 57.3 | 57.3 | 57.5 |
| $Al_2O_3$ | 17.5 | 17.5 | 17.5 | 17.5 | 17.5 |
| $TiO_2$ | 5.0 | 5.0 | 5.2 | 5.2 | 5.0 |
| MgO | 9.5 | 10.0 | 10.0 | 11.0 | 9.7 |
| FeO | | | | | |
| ZnO | | | | | |
| $Li_2O$ | | | | | |
| $K_2O$ | | | | | |
| $Na_2O$ | 6.3 | 6.3 | 5.0 | 5.0 | 6.3 |
| CaO | | | 1.0 | | |
| SrO | | | | | |
| BaO | | | | | |
| $P_2O_5$ | | | | | |
| $B_2O_3$ | 4.0 | 4.0 | 4.0 | 4.0 | 4.0 |
| $ZrO_2$ | | | | | |
| $CeO_2$ | | | | | |
| $Sb_2O_3$ | | | | | |
| $Y_2O_3$ | | | | | |
| CuO | | | | | |
| Total | 100 | 100 | 100 | 100 | 100 |
| $(Al_2O_3 + MgO)/SiO_2$ | 0.47 | 0.48 | 0.48 | 0.50 | 0.47 |
| Main crystal phase | $MgAl_2O_4$ | $MgAl_2O_4$ | $MgAl_2O_4$ | $MgAl_2O_4$ | $MgAl_2O_4$ |
| Crystallization temperature (° C.) | 750 | 750 | 750 | 750 | 750 |
| Retention time (minute) | 300 | 340 | 330 | 310 | 330 |
| Specific gravity after crystallization | 2.507 | 2.509 | 2.523 | 2.522 | 2.503 |
| Young's modulus E (GPa) | 89 | 87 | 87 | 87 | 87 |
| Vickers hardness (Hv) | 660 | 680 | 690 | 650 | 660 |
| Average crystal grain size (nm) | 3 | 3 | 2 | 2 | 3 |
| Maximum crystal grain size (nm) | 6 | 7 | 9 | 9 | 7 |
| Ra (Å) | 1.7 | 1.9 | 1.4 | 1.5 | 1.7 |

TABLE 27

| | Example No. (% by mass) 128 |
|---|---|
| $SiO_2$ | 55.8 |
| $Al_2O_3$ | 17.5 |
| $TiO_2$ | 5.2 |
| MgO | 8.0 |
| FeO | |
| ZnO | |
| $Li_2O$ | |
| $K_2O$ | 2.0 |
| $Na_2O$ | 6.5 |
| CaO | 1.0 |
| SrO | |
| BaO | |
| $P_2O_5$ | |
| $B_2O_3$ | 4.0 |
| $ZrO_2$ | |
| $CeO_2$ | |

TABLE 27-continued

| | Example No. (% by mass) 128 |
|---|---|
| Sb₂O₃ | |
| Y₂O₃ | |
| CuO | |
| Total | 100 |
| (Al₂O₃ + MgO)/SiO₂ | 0.46 |
| Main crystal phase | MgAl₂O₄ |
| Crystallization temperature (° C.) | 750 |
| Retention time (minute) | 300 |
| Specific gravity after crystallization | 2.511 |
| Young's modulus E (GPa) | 89 |
| Vickers hardness (Hv) | 680 |
| Average crystal grain size (nm) | 4 |
| Maximum crystal grain size (nm) | 9 |
| Ra (Å) | 1.8 |

The fracture toughness ($K_{1C}$) of the crystallized glass of Example 33 was 2.3.

The degree of crystallinity of the crystallized glass of Example 32 was measured by the Rietveld method. As a result, it was 11% by mass.

The substrate after polishing was observed whether or not bubbles exist inside the substrate using a microscope. As a result, in Examples 1 to 43, bubbles having a diameter of 10 μm or more were not observed.

In Comparative Example 1, the glass had high viscosity, and precipitation of crystals of RAl₂O₄ and R₂TiO₄ (wherein R is one or more selected from Mg and Fe) were not observed, and thus failed to obtain high Young's modulus.

In Comparative Example 2, precipitation of crystals of RAl₂O₄ and R₂TiO₄ (wherein R is one or more selected from Mg and Fe) was not observed and the glass caused phase separation, and thus surface roughness after polishing failed to satisfy requirements of a substrate for information recording medium of the next generation.

In Comparative Example 3, the specific gravity after crystallization is 2.72, and thus fails to satisfy requirements of a substrate for information recording medium of the next generation.

The substrate for information recording medium is in a condition ready for forming a magnetic film or an underlying film after performing a heat treatment to the glass prepared by a direct press method through a hole cutting step at central portion, grinding and polishing steps at inner and outer periphery, and both-side lapping and polishing steps. Furthermore, the substrate is optionally subjected to a strengthening treatment for formation of a compression stress layer. Various embodiments are envisaged with respect to the strengthening treatment:

(1) case of subjecting the substrate to a strengthening treatment before subjecting main surface to a lapping step;
(2) case of performing a strengthening treatment after subjecting main surface to a lapping step, and then performing a polishing step; and
(3) case of performing a strengthening treatment during a plurality of polishing steps;
(4) case of subjecting the substrate to a strengthening treatment after performing all polishing steps; and the like. The compression stress layer formed on main surface may be entirely removed by a lapping step and a polishing step to form a compression stress layer only at a periphery of the substrate.

The polished substrate for 2.5 inch information recording medium (65φ×0.8 mmt) of Example 40 was immersed in a mixed salt of potassium nitrate and sodium nitrate (KNO₃:NaNO₃=1:3) at 400° C. for 0.25 hour to form a 3 μm thick compression stress layer on the surface. It was confirmed for the substrate that the ring flexural strength has increased by 2 times of that before formation of the compression stress layer (460 MPa).

The "ring flexural strength" as used herein refers to a flexural strength measured by a concentric circle flexural method by preparing a thin disk-shaped sample having a diameter of 65 mm and a thickness of 0.8 mm and measuring a strength of the disk-shaped sample by a circular supporting ring and a load ring. It was also confirmed for the substrate that the fracture toughness ($K_{1C}$) has increased to 2.4.

The polished substrate for 2.5 inch information recording medium (65φ×0.8 mmt) of Example 28 was immersed in potassium nitrate salt (KNO₃) at 400° C. for 0.5 hour to form a 5 μm thick compression stress layer on the surface. It was confirmed for the substrate that the ring flexural strength has increased by 4 times of that before forming the compression stress layer (460 MPa). It was also confirmed for the substrate that that the fracture toughness ($K_{1C}$) has increased to 2.4.

The polished substrate for 2.5 inch for information recording medium (65φ×0.8 mmt) of Example 37 was heated to from 300° C. to 600° C. and then rapidly cooled by an air-cooling process to form a compression stress layer on the surface. It was confirmed for the substrate that the ring flexural strength and the fracture toughness ($K_{1C}$) have increased.

The heat-treated glass shaped body of Example 31 was sequentially processed and immersed in a potassium nitrate salt (KNO₃) at 490° C. for 1 hour after completion of first polishing to form a compression stress layer on the surface. Thereafter, the glass shaped body was washed with an aqueous alkaline solution (pH 10) and subjected to second polishing to produce a substrate for information recording medium. After completion of the polishing step, the compression stress layer was subjected to the measurement using a glass surface stress meter. As a result, the compression stress layer had a depth of 9 μm and compressive stress of 380 MPa. It was confirmed for the substrate that the ring flexural strength has increased by 7 to 9 times of that before forming the compression stress layer (470 MPa). It was confirmed for the substrate that the fracture toughness ($K_{1C}$) have increased to 4.0.

The heat-treated glass shaped body of Example 38 was sequentially processed and immersed in a potassium nitrate salt (KNO₃) at 570° C. for 2 hours after completion of a lapping step of main surface to form a compression stress layer on the surface. Thereafter, the glass shaped body was washed with an aqueous alkaline solution (pH 10) and subjected to first and second polishing to produce a substrate for information recording medium. After completion of the polishing step, the compression stress layer was subjected to the measurement using a glass surface stress meter. As a result, the compression stress layer had a depth of 15 μm and compressive stress of 400 MPa. It was confirmed for the substrate that the ring flexural strength has increased by 8 to 12 times of that before forming the compression stress layer (470 MPa). It was confirmed for the substrate that the fracture toughness ($K_{1C}$) have increased to 4.0.

Example 129

The heat-treated glass shaped body of Example 38 was processed, and then subjected to a hole cutting step at central portion, grinding and polishing steps at inner and outer periphery, and both-side lapping and polishing steps. The glass shaped body was immersed in a mixed salt of potassium nitrate and sodium nitrate ($KNO_3:NaNO_3=1:1$) at 450° C. for 0.17 hour to form a compression stress layer on the surface. Thereafter, main surface was sequentially subjected to a lapping step and a polishing step. After completion of the polishing step, the compression stress layer of main surface was removed, and the compression stress layer remained only at inner and outer periphery. It was confirmed for the substrate that the ring flexural strength has increased by 2 times of that before forming the compression stress layer (480 MPa). It was confirmed for the substrate that the fracture toughness ($K_{1C}$) is 2.1.

Example 130

Using a DC sputtering method, a chromium alloy foundation layer and a cobalt alloy magnetic layer were formed and a diamond-like carbon layer was further formed on the substrates obtained in Examples mentioned above, and then a perfluoro polyether lubricant was coated thereto to obtain information magnetic recording media.

With respect to the substrate for magnetic recording medium of the present invention, surface recording density can be increased, deflection or deformation does not generate even under higher revolution of the substrate itself, vibration due to the revolution can be reduced, and the number of errors (TMR) in reading data due to vibration or deflection can be decreased. Moreover, since the substrate of the present invention has excellent impact resistance, head crush or substrate breakage is unlikely to occur when the substrate is used for information recording media of mobile application in particular, and thus excellent stable motion and magnetic recording reproduction properties can be exhibited.

What is claimed is:

1. A crystallized glass containing, as a main crystal phase, one or more selected from $RAl_2O_4$ and $R_2TiO_4$ (wherein R is one or more selected from Mg and Fe),
   the crystallized glass comprising, in terms of mass percentage On an oxide basis,
   $SiO_2$ of 50% to 70%,
   $Al_2O_3$ of 10% to 26%,
   $TiO_2$ of 1 to 15%,
   MgO of 2.5% to 25%,
   FeO of 0% to 8%,
   ZnO of 0% to less than 2%, and
   $R'_2O$ component of 1 to 15% (wherein R' is one or more selected from Li, Na, and K),
   wherein the value of $(Al_2O_3+MgO)/SiO_2$ is 0.30 or more and 0.65 or less, and a specific gravity is less than 2.63.

2. The crystallized glass according to claim 1, wherein the total of the components of CaO, SrO, BaO, and $Y_2O_3$ is 1% or less, expressed in terms of mass percentage on an oxide basis.

3. The crystallized glass according to claim 1, wherein the $ZrO_2$ component is contained in the amount of 0% to 1.9%, expressed in terms of mass percentage on an oxide basis.

4. The crystallized glass according to claim 1, further comprising the components of
   $Al_2O_3$ of 12.8% to 26%,
   MgO of 2.5% to 15%, and
   $TiO_2$ of 1 to 11%, expressed in terms of mass percentage on an oxide basis,
   wherein the value of $(Al_2O_3+MgO)/SiO_2$ is 0.30 or more and 0.62 or less.

5. The crystallized glass according to claim 1, further comprising the components of
   CaO of 0% to 1%,
   SrO of 0% to 1%,
   BaO of 0% to 1%,
   $P_2O_5$ of 0% to 7%,
   $B_2O_3$ of 0% to 12%, and
   $Y_2O_3$ of 0% to 1%, expressed in terms of mass percentage on an oxide basis.

6. A crystallized glass substrate for information recording medium, using the crystallized glass according to claim 1.

7. The crystallized glass substrate for information recording medium according to claim 6, wherein a compression stress layer is formed at one or both of an outer periphery edge and an inner periphery edge of the crystallized glass substrate.

8. The crystallized glass substrate for information recording medium according to claim 6, wherein a compression stress layer is formed at one or both of two main surfaces of the crystallized glass substrate, and the thickness of the compression stress layer is less than 30 μm.

9. An information recording medium, using the crystallized glass substrate according to claim 6.

* * * * *